US008117086B1

(12) United States Patent
Utz et al.

(10) Patent No.: US 8,117,086 B1
(45) Date of Patent: Feb. 14, 2012

(54) ORDER TRACKING SYSTEM AND METHOD USING TRIGGER EVENTS

(75) Inventors: Karl Utz, Atlanta, GA (US); Sharon Sanford, Atlanta, GA (US); Carl Cliche, Gainesville, GA (US)

(73) Assignee: RBS Lynk Incorporated, Atlanta, GA (US)

( * ) Notice: Subject to any disclaimer, the term of this patent is extended or adjusted under 35 U.S.C. 154(b) by 1284 days.

(21) Appl. No.: 11/381,656

(22) Filed: May 4, 2006

(51) Int. Cl.
*G06Q 30/00* (2006.01)

(52) U.S. Cl. .................................................... 705/26.81

(58) Field of Classification Search .................... 705/26, 705/27, 26.1, 26.81, 27.1
See application file for complete search history.

(56) References Cited

U.S. PATENT DOCUMENTS

| | | | | |
|---|---|---|---|---|
| 6,684,213 | B1 | 1/2004 | Schell et al. | |
| 7,177,825 | B1 * | 2/2007 | Borders et al. | 705/26 |
| 2005/0289013 | A1 * | 12/2005 | Goldberg | 705/26 |

OTHER PUBLICATIONS

Lankford, Ray, "Capacity Management in Complex Production Environments," Production & Inventory Management Review & APICS News, May 1990, vol. 10(5), p. 40.*

* cited by examiner

*Primary Examiner* — Jeffrey A Smith
*Assistant Examiner* — Brandy A Zukanovich
(74) *Attorney, Agent, or Firm* — DLA Piper LLP (US)

(57) ABSTRACT

An order tracking system comprising an interface to an order tracking database for users such as sales agents and sales managers to quickly find orders and track them as they progress. The order tracking system may track merchant orders for payment processing equipment to be installed in one or more business locations and the initiation of related payment processing services using the installed equipment. Trigger events within multiple internal computerized business applications are communicated to the order tracking system where they are stored in the order tracking database. The computerized applications that are used to manage internal business may track many activities and events, some of which are trigger events, that result in updates to the order tracking database. The trigger events from the various internal business applications allow a user of the present invention to obtain a comprehensive view of the status of an order for a payment processing solution.

20 Claims, 17 Drawing Sheets

Click Here to Return to Saleslynk

Report Generation Date: 11/4/2004 1:47:22 PM
Report Date Range: 11/1/2004 to 11/4/2004

Region:     Regional Sales
District:   Holsen/Atlanta
Territory:  Holsen/Atlanta

Order Status Report

| Sales Order | Store Name | Entered | Installed | Paid | Shipped | Pay | Rate Conf. | Rate Acc. | Rate Appr. | Referral | Acct. Hold |
|---|---|---|---|---|---|---|---|---|---|---|---|
| Curran, Jennifer | | | | | | | | | | | |
| 739891 – E-Mail Party Store Inc. | | 11/1/2004 | | | 11/3/2004 | Yes–Change | Yes | Yes | Yes | No | No |
| Agent Totals: | | | | | | | | | | | |
| Salesperson, Jane | | | | | | | | | | | |
| 739813 – E-Mail Hoa Binh Enterprises, Inc. | | 11/1/2004 | | 11/5/2004 | 11/3/2004 | Yes–Change | Yes | Yes | Yes | No | No |
| 739904 – E-Mail Acuity management Corp | | 11/1/2004 | | 11/5/2004 | | Yes–Change | Yes | Yes | No | No | No |
| 739913 – E-Mail Gado Gado | | 11/1/2004 | | 11/5/2004 | 11/2/2004 | Yes–Change | Yes | Yes | Yes | No | No |
| 740793 – E-Mail L.E.P. Consultants Inc | | 11/4/2004 | | | | Yes–Change | Yes | Yes | Yes | No | No |
| 740798 – E-Mail James J Choi DDS | | 11/4/2004 | | | | Yes–Change | No | No | No | No | No |

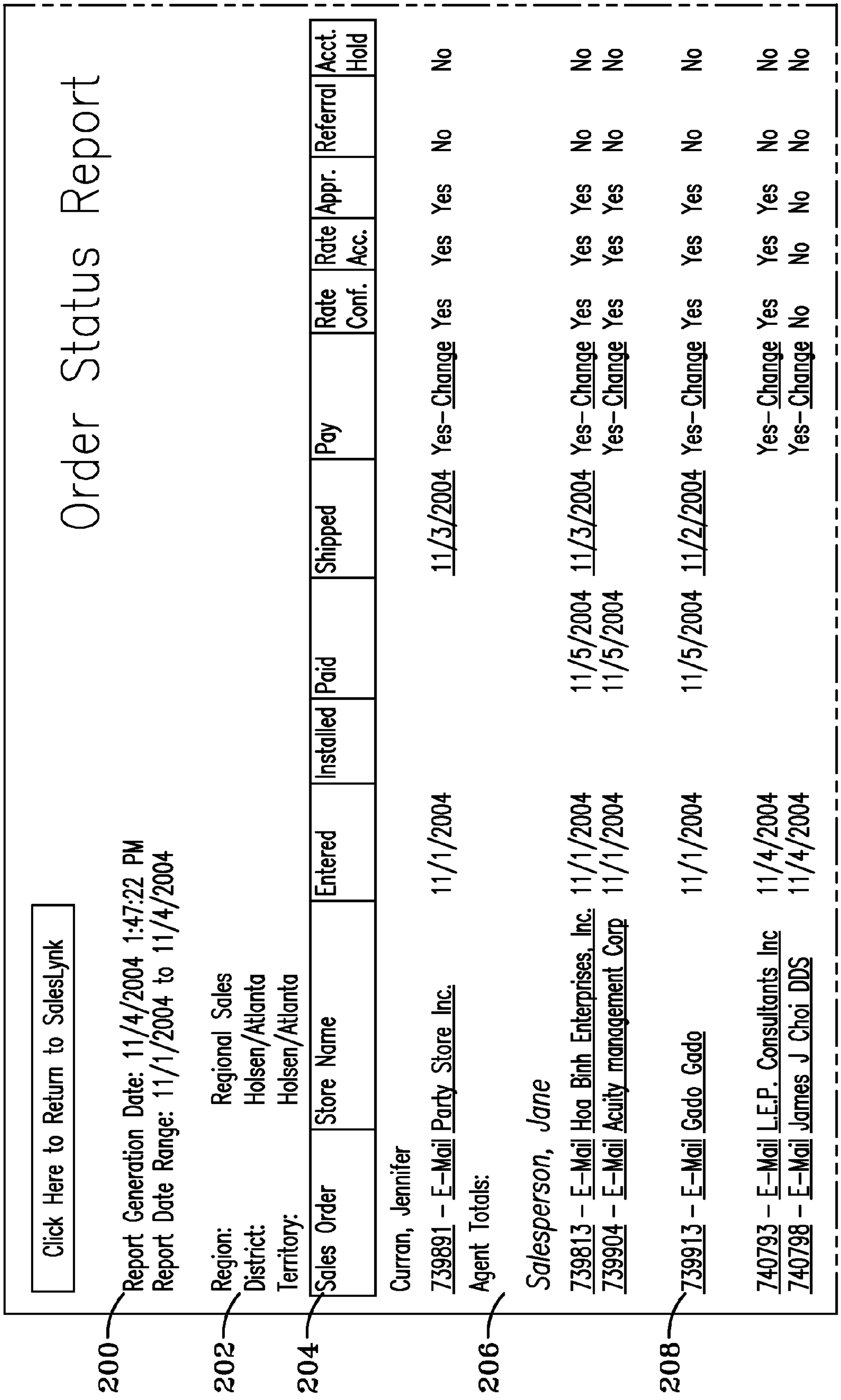

FIG-2

400 Your sales order is Pended as of 2/18/2005 4:18:54 PM

| Order Status | What it means | Icon |
|---|---|---|
| IN PROCESS | The order is currently being processed and in one of the following steps below. | → |
| 402 PENDED | The order is currently pended in one of the steps/activities below. | ⚠ |
| CANCELED | The order has been withdrawn or canceled and is no longer being processed. Review the steps below to see the last step the order was in before it was stopped. | ⊗ |
| COMPLETED | The order has been completely processed and the customer is functional. | √ |

FIG-4

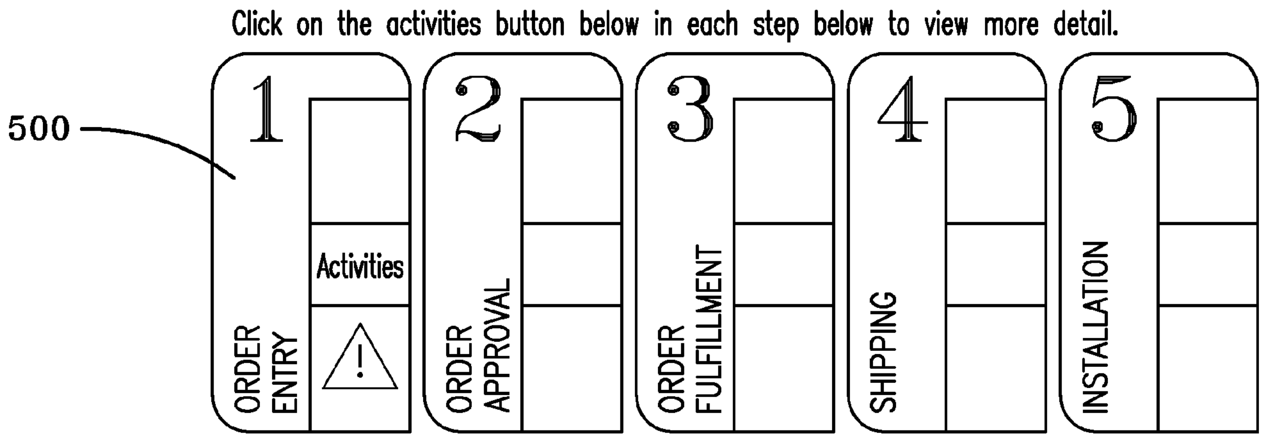

FIG-5

| Order Information | | |
|---|---|---|
| Order Submitted: | 2/4/05 | Lead Numbers: 786352 — 604 |
| Sales Channel: | Regional | Locations: 2 |
| District: | Schuylemann/Washington | Terminals: 4 |
| Territory: | Schuylemann/Washington | Customer: 1000800178-D & R Garden Centers |
| Sales Agent(s): | Jaffe, Harve | Merchant(s): 5429290008018764-D & R Garden Center #12 |
| | | 5429290008018765-D & R Garden Center #13 |
| | | 5429290008018766-D & R Garden Center #14 |

Expand | Collapse — 602

600

Order Tracker

Sales Order Number: [ ] [Search] Advanced Search

Sales Order: 700122

Order Information | Expand | Collapse | BACK to Order Status Page

Step 1:: ORDER ENTRY

| Activity | Store Name | Terminal ID | Event | Start Date | End Date | Notes |
|---|---|---|---|---|---|---|
| Data Entry | | | | | | |
| | | | Order Received | 2/2/05 8:01 AM | 2/2/05 8:01 AM | |
| | | | Applied for New XXX Account | 2/2/05 8:01 AM | 2/2/05 8:01 AM | |
| | | | Applied for New YYY Account | 2/2/05 8:20 AM | 2/2/05 8:20 AM | |
| | | | New Account Activated by XXX | 2/4/05 11:20 AM | 2/4/05 11:20 AM | 📝 |
| | | | New Account Activated by YYY | 2/4/05 11:20 AM | 2/4/05 11:20 AM | 📝 |
| Quality Control | | | | | | |
| | | | QC Review of CPA Data | 2/2/05 8:20 AM | 2/4/05 11:20 AM | |
| | | | Pictures Received | 2/4/05 11:12 AM | 2/4/05 11:12 AM | |
| | | | Financials Received | 2/4/05 11:12 AM | 2/4/05 11:12 AM | |
| | | | Lease Received | 2/4/05 11:12 AM | 2/4/05 11:12 AM | |
| | | | Statements Received | 2/4/05 11:13 AM | 2/4/05 11:13 AM | |
| | | | CPA Pages 1 and 2 Received | 2/4/05 11:14 AM | 2/4/05 11:14 AM | |
| | | | Lease Check Received | 2/4/05 11:15 AM | 2/4/05 11:15 AM | |

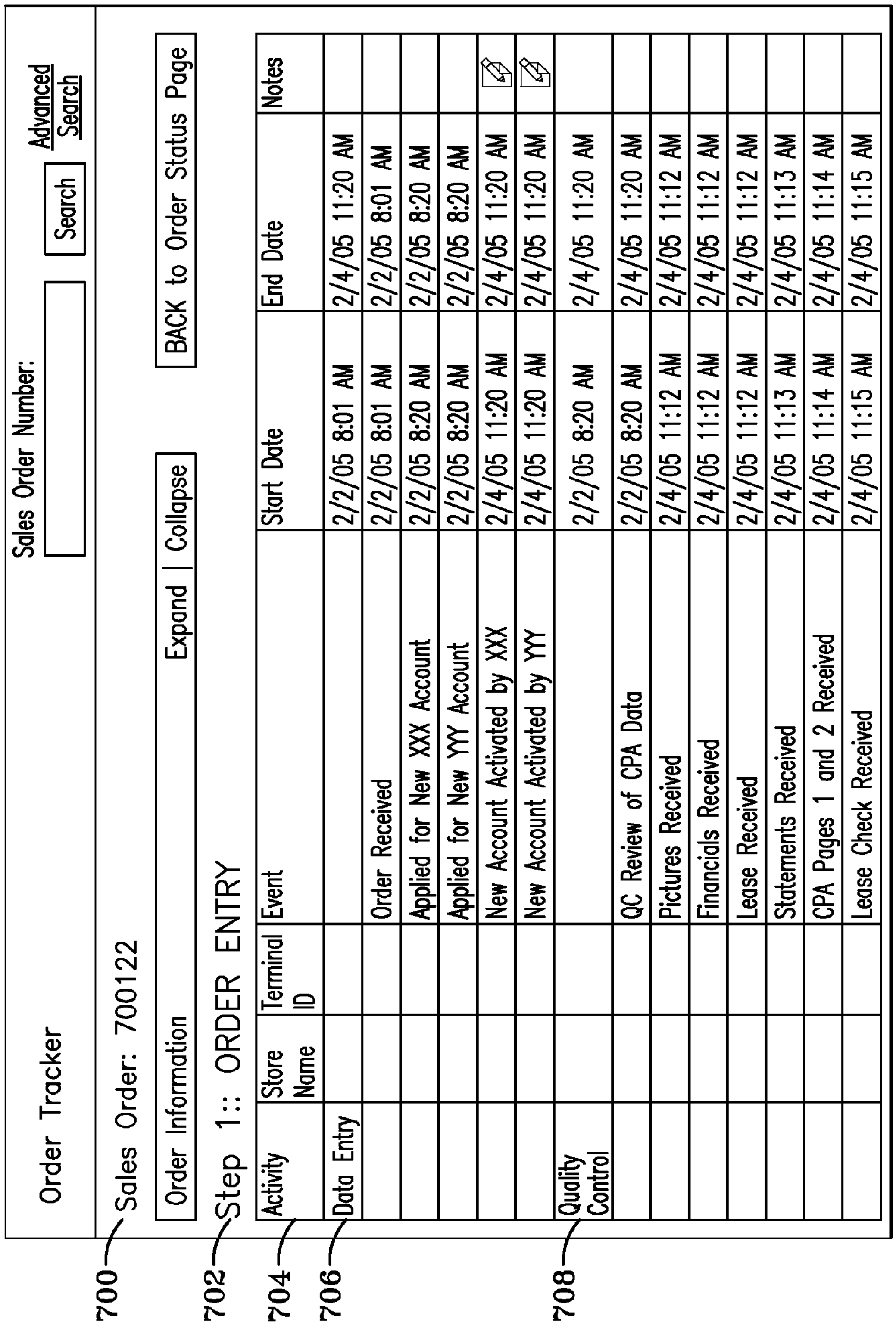

FIG-7

Figure 8:
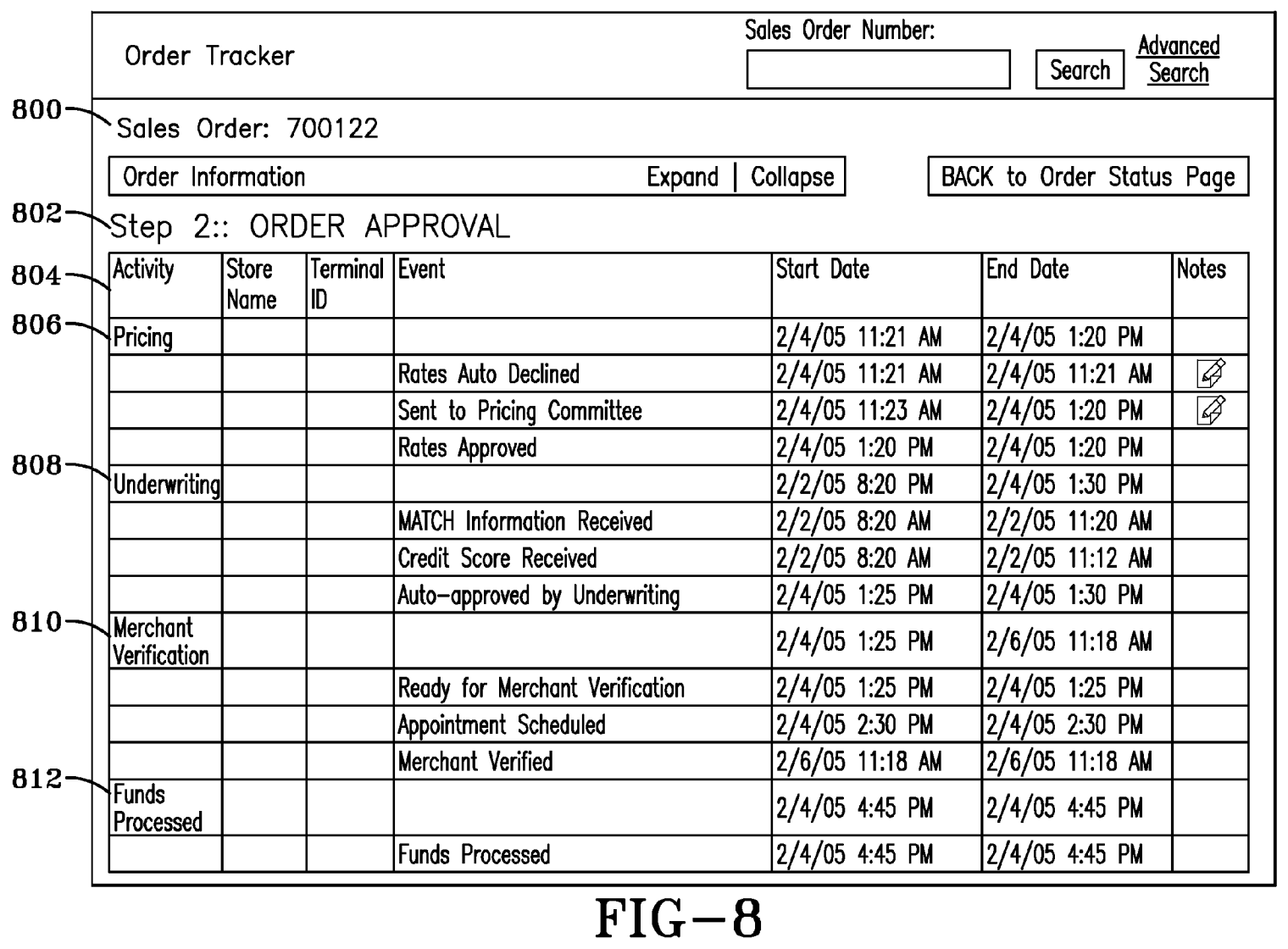

Order Tracker

Sales Order Number: [ ] Search Advanced Search

800 Sales Order: 700122

Order Information Expand | Collapse

BACK to Order Status Page

802 Step 2:: ORDER APPROVAL

| Activity | Store Name | Terminal ID | Event | Start Date | End Date | Notes |
|---|---|---|---|---|---|---|
| Pricing | | | | 2/4/05 11:21 AM | 2/4/05 1:20 PM | |
| | | | Rates Auto Declined | 2/4/05 11:21 AM | 2/4/05 11:21 AM | |
| | | | Sent to Pricing Committee | 2/4/05 11:23 AM | 2/4/05 1:20 PM | |
| | | | Rates Approved | 2/4/05 1:20 PM | 2/4/05 1:20 PM | |
| Underwriting | | | | 2/2/05 8:20 PM | 2/4/05 1:30 PM | |
| | | | MATCH Information Received | 2/2/05 8:20 AM | 2/2/05 11:20 AM | |
| | | | Credit Score Received | 2/2/05 8:20 AM | 2/2/05 11:12 AM | |
| | | | Auto-approved by Underwriting | 2/4/05 1:25 PM | 2/4/05 1:30 PM | |
| Merchant Verification | | | | 2/4/05 1:25 PM | 2/6/05 11:18 AM | |
| | | | Ready for Merchant Verification | 2/4/05 1:25 PM | 2/4/05 1:25 PM | |
| | | | Appointment Scheduled | 2/4/05 2:30 PM | 2/4/05 2:30 PM | |
| | | | Merchant Verified | 2/6/05 11:18 AM | 2/6/05 11:18 AM | |
| Funds Processed | | | | 2/4/05 4:45 PM | 2/4/05 4:45 PM | |
| | | | Funds Processed | 2/4/05 4:45 PM | 2/4/05 4:45 PM | |

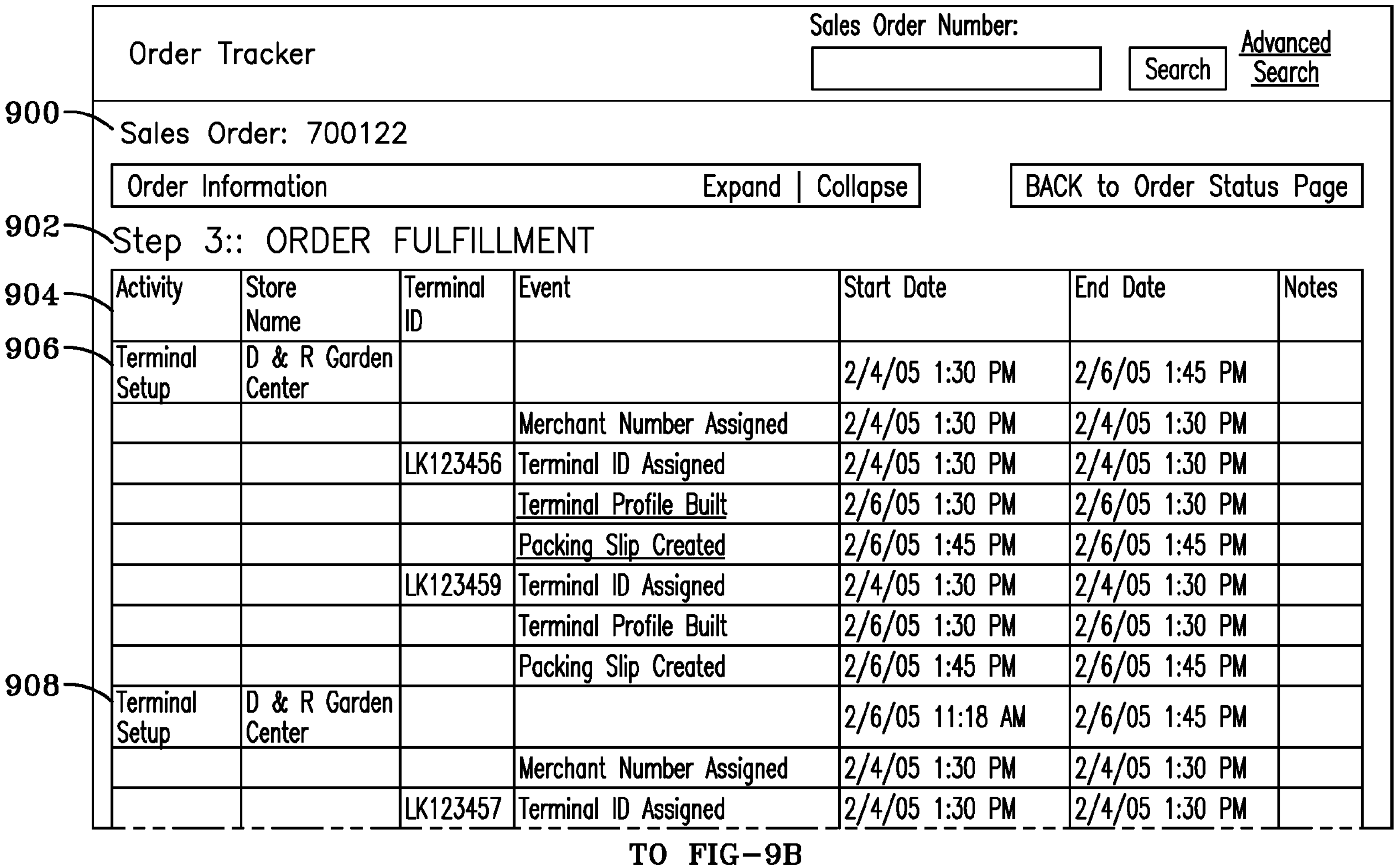

| Activity | Store Name | Terminal ID | Event | Start Date | End Date | Notes |
|---|---|---|---|---|---|---|
| Terminal Setup | D & R Garden Center | | | 2/4/05 1:30 PM | 2/6/05 1:45 PM | |
| | | | Merchant Number Assigned | 2/4/05 1:30 PM | 2/4/05 1:30 PM | |
| | | LK123456 | Terminal ID Assigned | 2/4/05 1:30 PM | 2/4/05 1:30 PM | |
| | | | Terminal Profile Built | 2/6/05 1:30 PM | 2/6/05 1:30 PM | |
| | | | Packing Slip Created | 2/6/05 1:45 PM | 2/6/05 1:45 PM | |
| | | LK123459 | Terminal ID Assigned | 2/4/05 1:30 PM | 2/4/05 1:30 PM | |
| | | | Terminal Profile Built | 2/6/05 1:30 PM | 2/6/05 1:30 PM | |
| | | | Packing Slip Created | 2/6/05 1:45 PM | 2/6/05 1:45 PM | |
| Terminal Setup | D & R Garden Center | | | 2/6/05 11:18 AM | 2/6/05 1:45 PM | |
| | | | Merchant Number Assigned | 2/4/05 1:30 PM | 2/4/05 1:30 PM | |
| | | LK123457 | Terminal ID Assigned | 2/4/05 1:30 PM | 2/4/05 1:30 PM | |

FROM FIG-9A

| | | | | | | | |
|---|---|---|---|---|---|---|---|
| | | | | Terminal Profile Built | 2/6/05 1:30 PM | 2/6/05 1:30 PM | |
| | | | | Packing Slip Created | 2/6/05 1:45 PM | 2/6/05 1:45 PM | |
| | | | LK123458 | Terminal ID Assigned | 2/4/05 1:30 PM | 2/4/05 1:30 PM | |
| | | | | Terminal Profile Built | 2/6/05 1:30 PM | 2/6/05 1:30 PM | |
| | | | | Packing Slip Created | 2/6/05 1:45 PM | 2/6/05 1:45 PM | |
| 910 | Deployment | D & R Garden Center | | | 2/6/05 1:50 PM | 2/6/05 2:20 PM | |
| | | | LK123456 | Packing Slip Printed | 2/6/05 1:50 PM | 2/6/05 1:50 PM | |
| | | | | Equipment Set Completed | 2/6/05 2:00 PM | 2/6/05 2:00 PM | |
| | | | | Deployment QA | 2/6/05 2:10 PM | 2/6/05 2:20 PM | |
| | | | LK123459 | Packing Slip Printed | 2/6/05 1:50 PM | 2/6/05 1:50 PM | |
| | | | | Equipment Set Completed | 2/6/05 2:00 PM | 2/6/05 2:00 PM | |
| | | | | Deployment QA | 2/6/05 2:10 PM | 2/6/05 2:20 PM | |
| 912 | Deployment | D & R Garden Center | | | 2/6/05 1:50 PM | 2/6/05 2:20 PM | |
| | | | LK123457 | Packing Slip Printed | 2/6/05 1:50 PM | 2/6/05 1:50 PM | |
| | | | | Equipment Set Completed | 2/6/05 2:00 PM | 2/6/05 2:00 PM | |
| | | | | Deployment QA | 2/6/05 2:10 PM | 2/6/05 2:20 PM | |
| | | | LK123458 | Packing Slip Printed | 2/6/05 1:50 PM | 2/6/05 1:50 PM | |
| | | | | Equipment Set Completed | 2/6/05 2:00 PM | 2/6/05 2:00 PM | |
| | | | | Deployment QA | 2/6/05 2:10 PM | 2/6/05 2:20 PM | |

FIG-9B

Order Tracker

Sales Order Number: [ ] Search

Advanced Search

1000 — Sales Order: 700122

1002 — Order Information | Expand | Collapse | BACK to Order Status Page

1004 — Step 4:: SHIPPING

| Activity | Store Name | Terminal ID | Event | Tracking ID | Start Date | End Date | Notes |
|---|---|---|---|---|---|---|---|
| Shipping | D & R Garden Center | | | | | | |
| | | LK123456 | Shipping QA | | 2/6/05 2:20 PM | 2/6/05 3:48 PM | |
| | | | Tracking ID Assigned | 00000-12345678-11 | 2/6/05 2:20 PM | 2/6/05 3:15 PM | |
| | | | Ready for Pick-up | | 2/6/05 3:40 PM | 2/6/05 3:40 PM | |
| | | LK123459 | Shipping Quality Assurance | | 2/6/05 3:48 PM | 2/6/05 3:48 PM | |
| | | | Tracking ID Assigned | 00000-12345678-12 | 2/6/05 2:20 PM | 2/6/05 3:15 PM | |
| | | | Ready for Pick-up | | 2/6/05 3:40 PM | 2/6/05 3:40 PM | |
| | | | | | 2/6/05 3:48 PM | 2/6/05 3:48 PM | |

1006 —

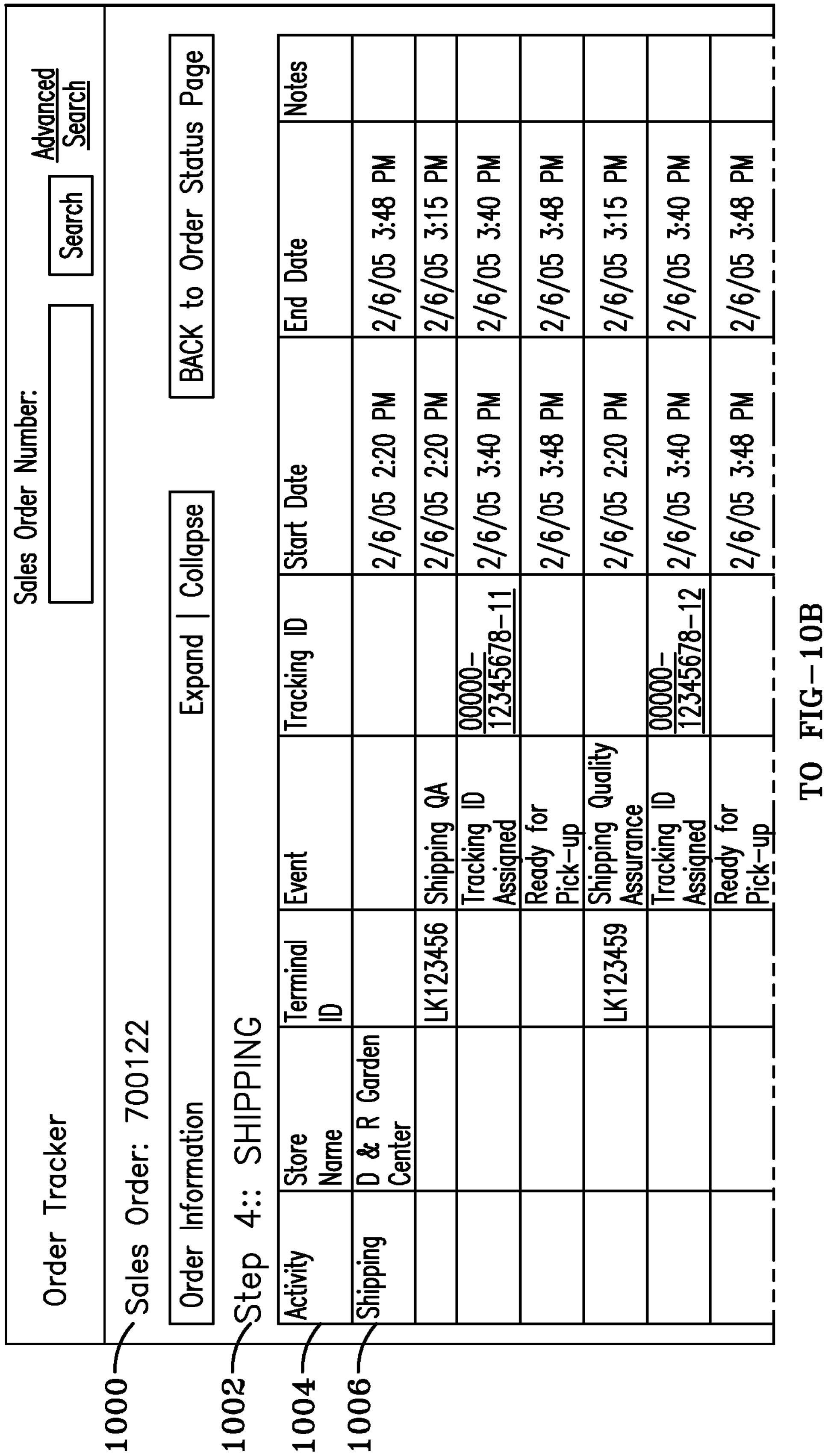

FIG-10A

FROM FIG-10A

1008

| | | | | | | | |
|---|---|---|---|---|---|---|---|
| Shipping | D & R Garden Center | | | | 2/6/05 2:20 PM | 2/6/05 2:20 PM | |
| | | LK123457 | Shipping Quality Assurance | | 2/6/05 2:20 PM | 2/6/05 3:15 PM | |
| | | | Tracking ID Assigned | 00000-12345679-23 | 2/6/05 3:40 PM | 2/6/05 3:40 PM | |
| | | | Ready for Pick-up | | 2/6/05 3:48 PM | 2/6/05 3:48 PM | |
| | | LK123458 | Shipping Quality Assurance | | 2/6/05 2:20 PM | 2/6/05 3:15 PM | |
| | | | Tracking ID Assigned | 00000-12345679-24 | 2/6/05 3:40 PM | 2/6/05 3:40 PM | |
| | | | Ready for Pick-up | | 2/6/05 3:48 PM | 2/6/05 3:48 PM | |

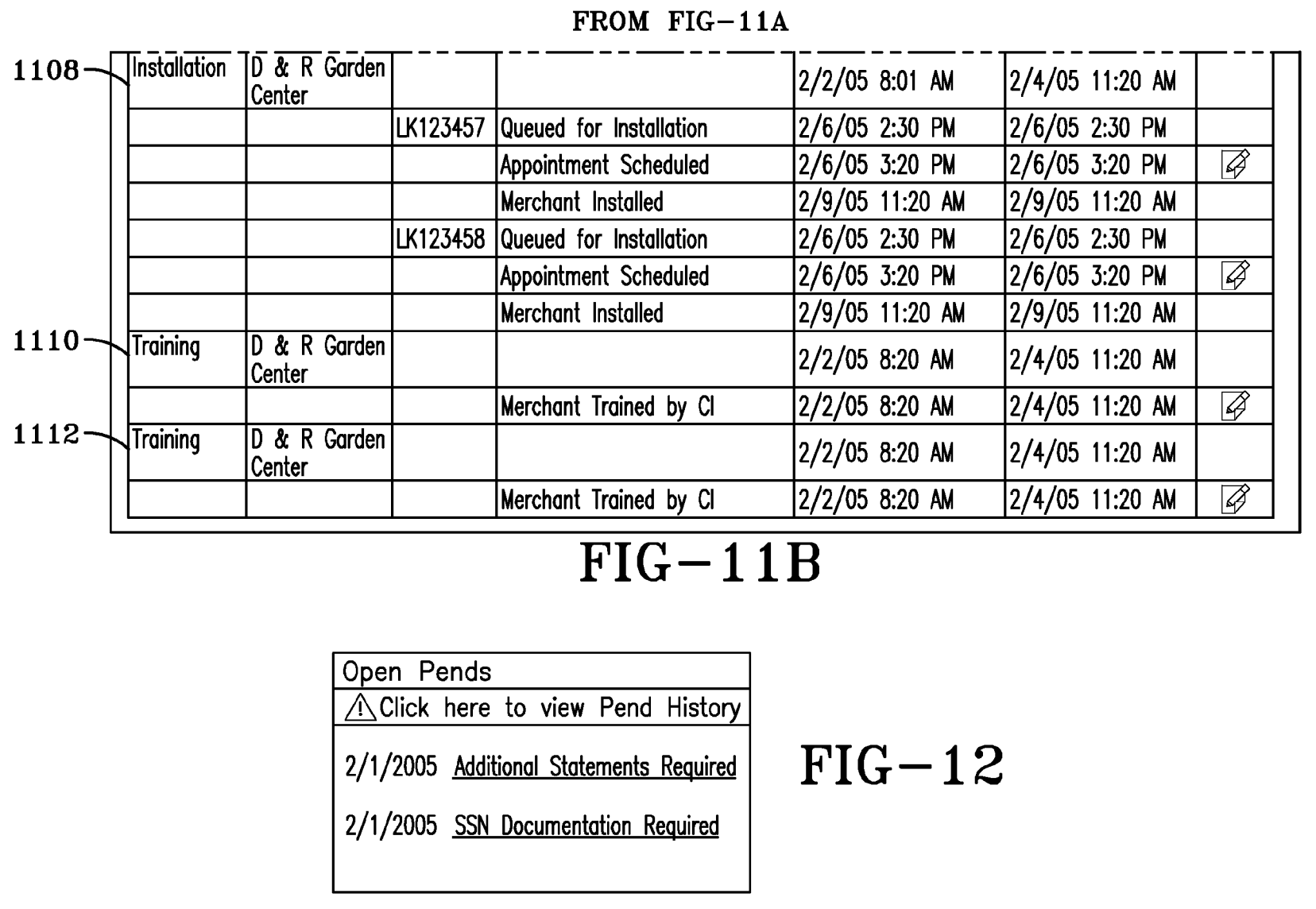

FROM FIG-11A

| | | | | | | | |
|---|---|---|---|---|---|---|---|
| 1108 | Installation | D & R Garden Center | | | 2/2/05 8:01 AM | 2/4/05 11:20 AM | |
| | | | LK123457 | Queued for Installation | 2/6/05 2:30 PM | 2/6/05 2:30 PM | |
| | | | | Appointment Scheduled | 2/6/05 3:20 PM | 2/6/05 3:20 PM | ✎ |
| | | | | Merchant Installed | 2/9/05 11:20 AM | 2/9/05 11:20 AM | |
| | | | LK123458 | Queued for Installation | 2/6/05 2:30 PM | 2/6/05 2:30 PM | |
| | | | | Appointment Scheduled | 2/6/05 3:20 PM | 2/6/05 3:20 PM | ✎ |
| | | | | Merchant Installed | 2/9/05 11:20 AM | 2/9/05 11:20 AM | |
| 1110 | Training | D & R Garden Center | | | 2/2/05 8:20 AM | 2/4/05 11:20 AM | |
| | | | | Merchant Trained by CI | 2/2/05 8:20 AM | 2/4/05 11:20 AM | ✎ |
| 1112 | Training | D & R Garden Center | | | 2/2/05 8:20 AM | 2/4/05 11:20 AM | |
| | | | | Merchant Trained by CI | 2/2/05 8:20 AM | 2/4/05 11:20 AM | ✎ |

FIG-11B

Open Pends

⚠ Click here to view Pend History

2/1/2005 Additional Statements Required

2/1/2005 SSN Documentation Required

FIG-12

Figure 13A:
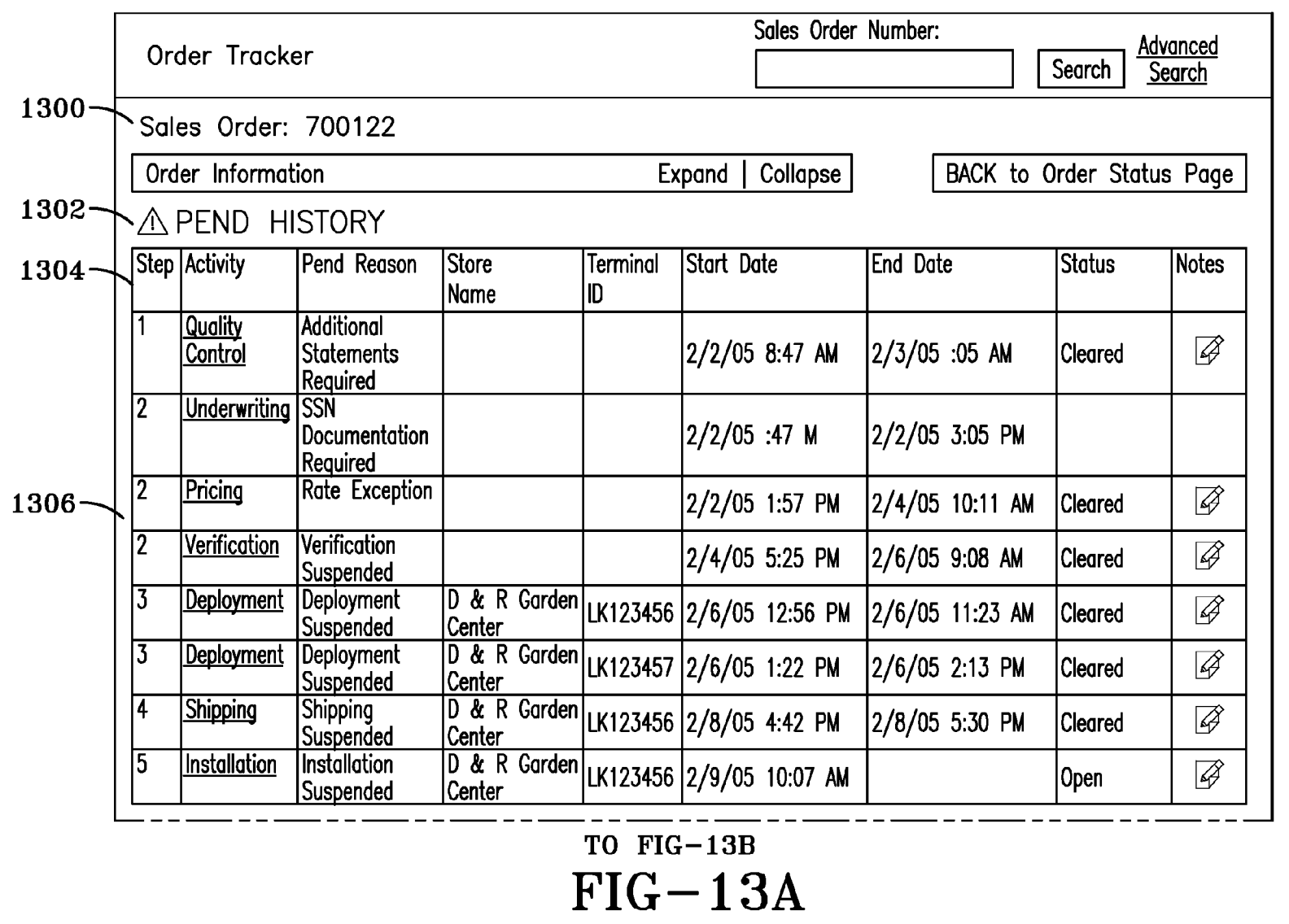

Order Tracker

Sales Order Number: [ ] Search Advanced Search

1300 Sales Order: 700122

Order Information Expand | Collapse

BACK to Order Status Page

1302 ⚠ PEND HISTORY

1304

1306

| Step | Activity | Pend Reason | Store Name | Terminal ID | Start Date | End Date | Status | Notes |
|---|---|---|---|---|---|---|---|---|
| 1 | Quality Control | Additional Statements Required | | | 2/2/05 8:47 AM | 2/3/05 :05 AM | Cleared | ✎ |
| 2 | Underwriting | SSN Documentation Required | | | 2/2/05 :47 M | 2/2/05 3:05 PM | | |
| 2 | Pricing | Rate Exception | | | 2/2/05 1:57 PM | 2/4/05 10:11 AM | Cleared | ✎ |
| 2 | Verification | Verification Suspended | | | 2/4/05 5:25 PM | 2/6/05 9:08 AM | Cleared | ✎ |
| 3 | Deployment | Deployment Suspended | D & R Garden Center | LK123456 | 2/6/05 12:56 PM | 2/6/05 11:23 AM | Cleared | ✎ |
| 3 | Deployment | Deployment Suspended | D & R Garden Center | LK123457 | 2/6/05 1:22 PM | 2/6/05 2:13 PM | Cleared | ✎ |
| 4 | Shipping | Shipping Suspended | D & R Garden Center | LK123456 | 2/8/05 4:42 PM | 2/8/05 5:30 PM | Cleared | ✎ |
| 5 | Installation | Installation Suspended | D & R Garden Center | LK123456 | 2/9/05 10:07 AM | | Open | ✎ |

FROM FIG-13A

| Step: | 5 | Pend Reason: | Installation Suspended |
|---|---|---|---|
| Activity: | Installation | Note: | Customer is unwilling to install. AE needs to contact customer and then call Sales Support. |
| Store Name: | | | |
| Terminal ID: | | UserName: | NRep |
| Start Date: | 2/9/05 10:07 AM | | |
| End Date: | | | |

1308

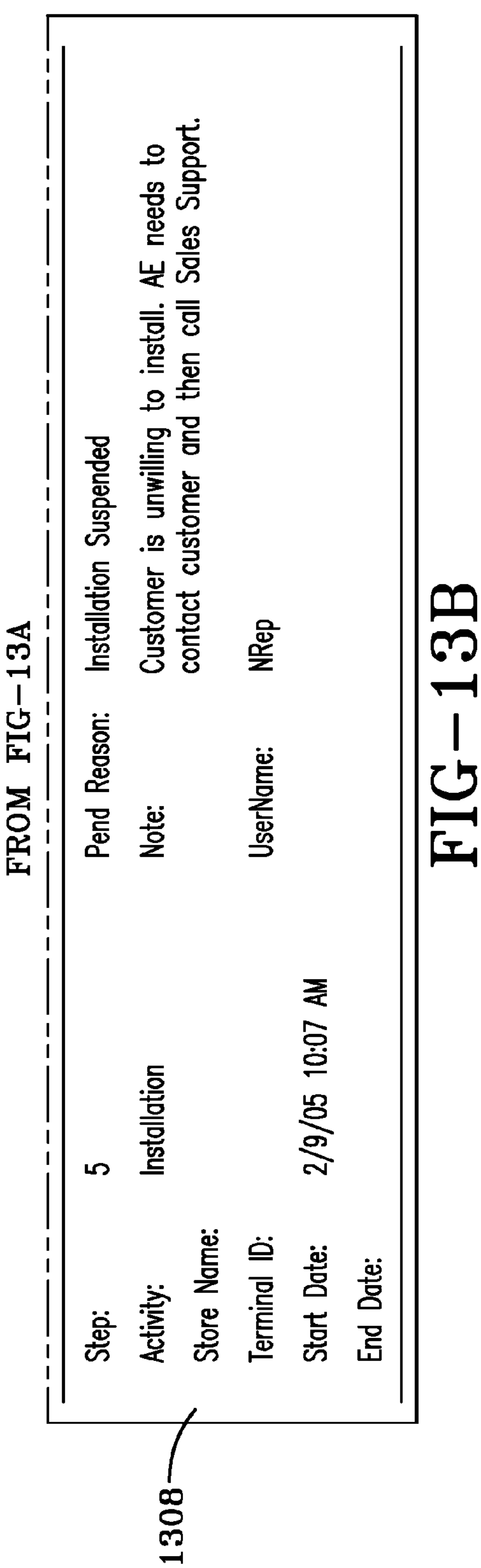

FIG-13B

Order Tracker      Sales Order Number: [ ] Search   Advanced Search

1400 — Sales Order: 700122

1402 — Order Information     Expand | Collapse     BACK to Order Status Page

1404 — Shipping Information

| Location | Ship Date/Time | Tracking Number | Equipment | Serial Number |
|---|---|---|---|---|
| D & R Garden Ctr #1201 | 3/11/05 8:11 AM | 700404745938 | Terminal – Omni 3200SE SoftPay | 710-472-708 |
| | | | Terminal – Omni 3200SE SoftPay | 710-852-963 |
| D & R Garden Ctr #609 | 3/11/05 8:11 AM | 700404745939 | Terminal – Omni 3200SE SoftPay | 710-658-955 |
| | | | Terminal – Omni 3200SE SoftPay | 710-853-961 |

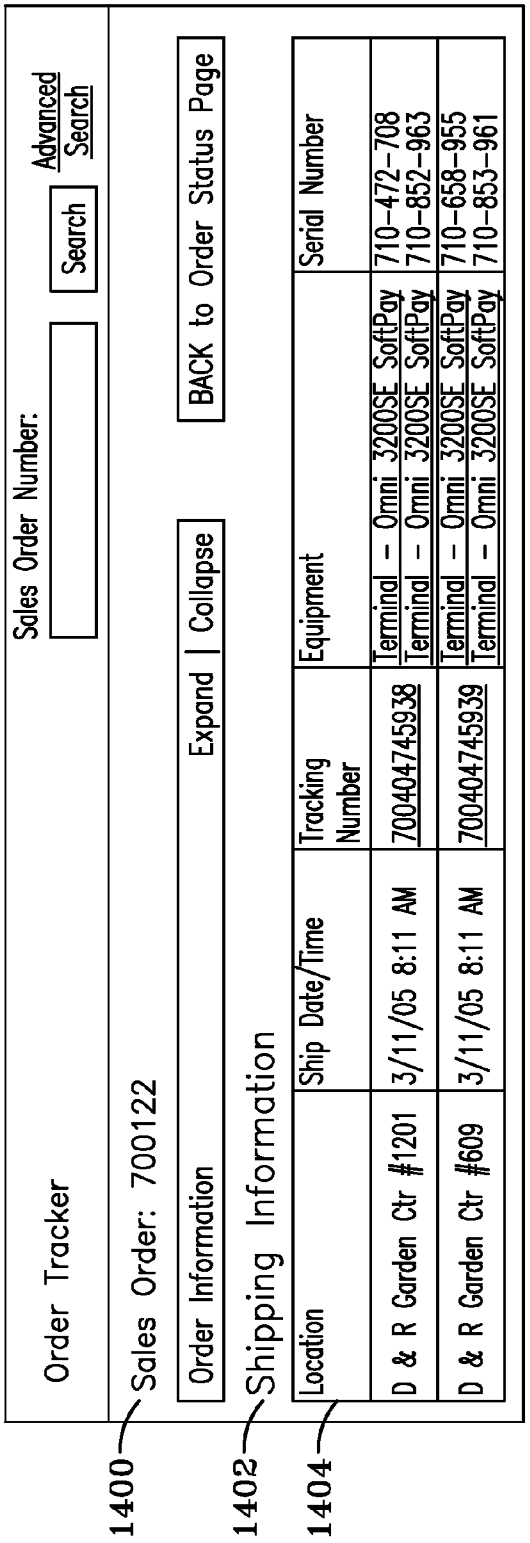

FIG-14

Order Tracker

Report Level

Click to select a level:
- ☐—○ Entire Company
  - ☐—◁ Acquired Portfolios
  - ☐—◁ Bank Alliance
  - ☐—◁ CashLynk
  - ☐—◁ Central Sales
  - ☐—◁ Corporate
  - ☐—◁ MSP
  - ☐—◁ National Sales
  - ☐—◁ Regional Sales
  - ☐—◁ VAR Sales Order Number:
[        ] [Search]

Advanced Search

Report Options

Date Criteria

Today | Yesterday | This Week | This Month | Last Month

Start Date          End Date
[5/2/2005 ▽]       [5/2/2005 ▽]

☐ Order Status:
[            ▽]

☐ Key Value:
[            ▽]
[            ]

[Submit]            [Reset]

1502

1500

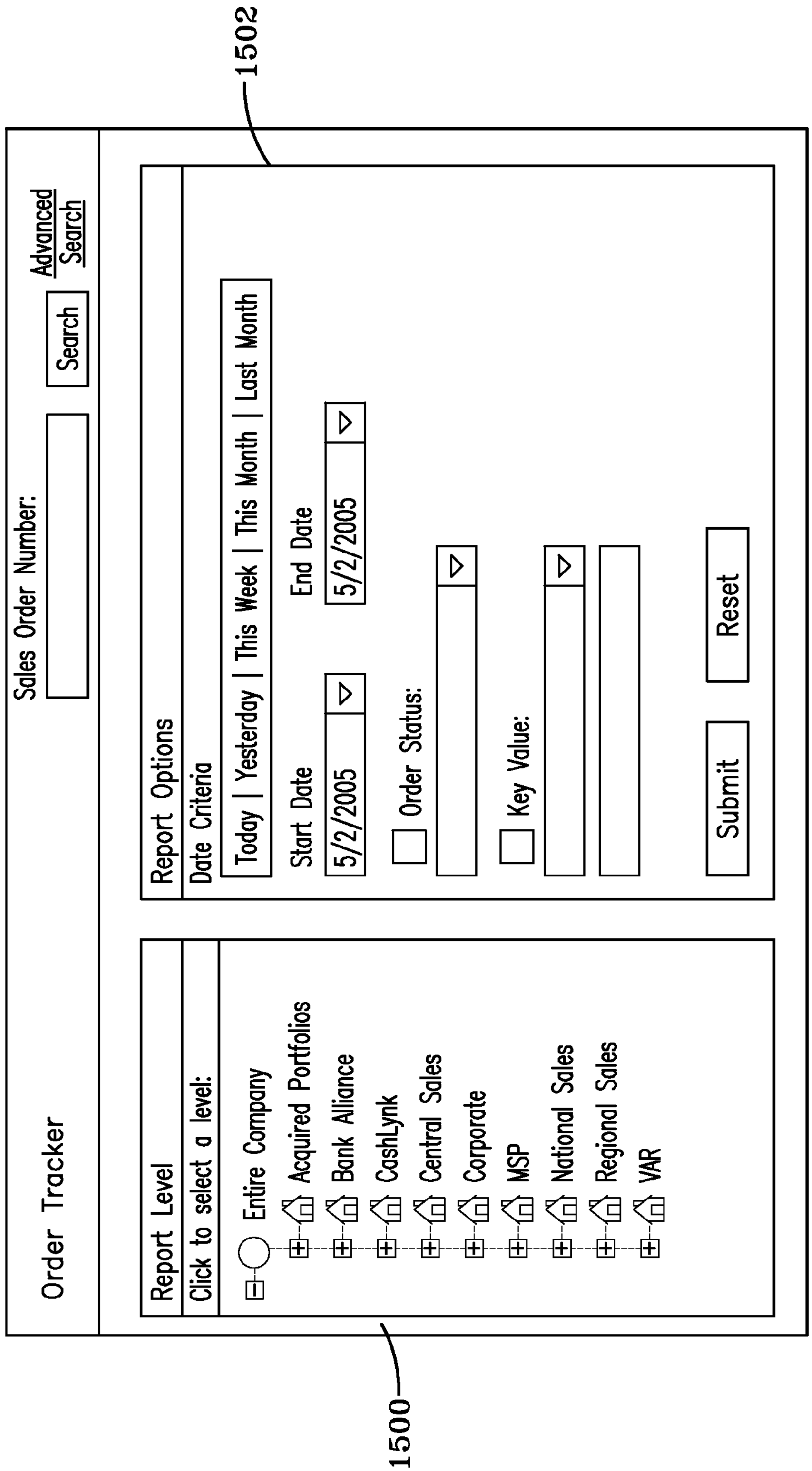

Search Results

Revise Search | New Search

Report Level: 121581 – Jane Salesperson, Order Submit Date: 4/10/2004 – 7/10/2004

| Status | Submit Date | Sales Order | Sales Agent | Customer Nbr | Customer Name | Merchant Nbr | Store Name | Terminals | Support |
|---|---|---|---|---|---|---|---|---|---|
| ⚠ | 4/10/2004 | 678322 | Jane Salesperson | 1010000001 | Sharon Corporation | 5429298011223 | Sharon's Shoe Store | LK098574 | ▤ |
| ✓ | 4/28/2004 | 689563 | Jane Salesperson | 1010000082 | Egos Salon | 5429298011224 | Egos Salon | LK123456 | ▤ |
| ✓ | 5/10/2004 | 712584 | Jane Salesperson | 1010000933 | Gourmet Deli, Inc. | 5429298011225 | Ron's Gourmet Deli | LK134567 | ▤ |
| | | | | | | 5429298011226 | Gourmet Deli | LK134589 | |
| | | | | | | 5429298011227 | Max's Gourmet Deli | LK135874 | |
| → | 5/20/2004 | 755266 | Jane Salesperson | 1010003261 | Watson & Associates | | Watson & Associates | LK135912 | ▤ |
| | | | | | | | | LK135914 | |
| ✓ | 5/21/2004 | 755667 | Jane Salesperson | 1010002585 | Good Health Food Stores | 5429298011228 | Good Health | LK135914 | ▤ |
| ⊗ | 5/23/2004 | 755721 | Jane Salesperson | 1010025069 | Market Networks, LLC | | Market Networks | | ▤ |
| ✓ | 5/23/2004 | 755732 | Jane Salesperson | 1010250352 | Chopstix, LLC | 5429298011229 | Chopstix #2 | LK135915 | ▤ |
| → | 6/10/2004 | 756253 | Jane Salesperson | 1010321731 | Studio Tan Salons | | Studio Tan #206 | | ▤ |
| | | | | | | | Studio Tan #207 | | |

ORDER TRACKING SYSTEM AND METHOD USING TRIGGER EVENTS

CROSS REFERENCES TO RELATED APPLICATIONS

None.

FIELD OF THE INVENTION

The present invention relates generally to order tracking systems and methods. In particular, the present invention relates to an order tracking system and method that integrates data from multiple business applications using trigger events.

BACKGROUND OF THE INVENTION

In response to consumer preferences to use payment cards such as credit and debit cards to make purchases, many merchants today are purchasing and installing in their places of business payment processing solutions that include equipment and related services. The payment processing equipment and services allow merchants to accept a variety of payment cards from their customers. Although merchants may be charged fees for accepting such types of payments, the increased spending power provided by payment cards may result in higher per visit charges that offset the costs associated with the acceptance of the cards. Consumers may be reminded of items they need while shopping or simply make additional purchases on impulse. As a result, consumers may purchase more items with payment cards than they would if paying cash.

In response to merchant demand for payment processing solutions, many payment processing vendors provide integrated solutions that include card processing equipment as well as merchant account services for payment processing. The solutions may be designed to service multiple business categories such as retail, wholesale, mail order, and e-commerce businesses and may include components that can be customized to develop a system that best meets the merchant's specific business needs. The integrated solution approach allows the merchant to work with one vendor that provides all of the necessary equipment, installation services, and finally, payment processing services that allow the merchant to accept various types of payment cards at the merchant's place or places of business.

Although an integrated payment processing solution simplifies the process of acquiring, installing, and activating card processing equipment for merchants, it actually involves many different tasks that need to be completed by many members of a vendor team. It may involve preparing and approving paperwork associated with a merchant order, underwriting a merchant account, ordering equipment from OEMs, packing equipment for shipment to merchant locations, shipping packed equipment to merchant locations, scheduling appointments to install equipment at merchant locations, installing equipment at merchant locations, certifying equipment installed at merchant locations, etc. Each of the tasks may involve multiple subtasks. In some instances, the vendor may use internal business applications to track and monitor a small group of tasks associated with one phase in the process. Team members involved in completion of one phase in the process may have the ability to track progress within their area of responsibility. The business applications, however, execute independently of one another. Information cannot be shared between the applications so it is difficult or impossible to determine the overall status of a particular order. A sales agent that has placed an order on behalf of a merchant may need to consult multiple business applications or make multiple telephone calls to different vendor team members to determine whether an order for a merchant has been completed. If the order has not been completed, identifying the phase within the process and further identifying a problem in the process can be very time consuming for the sales agent.

There is a need for a computerized order tracking system for integrated payment processing systems that allows sales agents and other users to determine the status of a merchant order for a payment processing solution. There is also a need for a computerized order tracking system for payment processing solutions that integrates information from multiple internal business applications that assist members of a vendor team in providing a merchant with a payment processing solution.

SUMMARY OF THE INVENTION

The present invention is a scalable web-based application for users such as sales agents and sales managers to quickly find orders and track them as they progress. In an example embodiment of the present invention, the invention is used to track the progress of a merchant order for payment processing equipment to be installed in one or more business locations and the initiation of related payment processing services using the installed equipment. Trigger events within multiple internal computerized business applications for providing payment processing equipment and services are communicated to a computerized order tracking system stored in an order tracking database. The computerized applications that are used to manage internal business may track many activities and events, only some of which are trigger events that result in updates to the order tracking database. Information is retrieved from the order tracking database upon request and presented to users that would like to review the status of an order.

The order tracking system of the present invention comprises an order tracking database and a browser-based interface to the order tracking database. The presentation layer is called the order tracking interface. Various computerized applications that are used to manage internal business processes trigger events that update the order tracking database. The trigger events from the various internal business applications allow a user of the present invention to obtain a comprehensive view of the status of an order for a payment processing solution.

BRIEF DESCRIPTION OF THE DRAWINGS

FIG. 2 is an order status report display for an example embodiment of the present invention;

FIG. 4 is a status indicator display for an example embodiment of the present invention;

FIG. 5 is a step status display for an example embodiment of the present invention;

FIG. 7 is an order entry step page display for an example embodiment of the present invention;

FIG. 8 is an order approval step page display for an example embodiment of the present invention;

FIGS. 9A and 9B are an order fulfillment step page display for an example embodiment of the present invention;

FIGS. 10A and 10B are a shipping step page display for an example embodiment of the present invention;

FIGS. 11A and 11B are an installation step page for an example embodiment of the present invention;

FIG. 12 is an open pends box display for an example embodiment of the present invention;

FIGS. 13A and 13B are a pend history report display for an example embodiment of the present invention;

FIG. 14 is a shipping information report display for an example embodiment of the present invention;

FIG. 15 is an advanced search filter display for an example embodiment of the present invention; and FIG. 16 is a search results page for an example embodiment of the present invention.

DESCRIPTION OF EXAMPLE EMBODIMENTS

The terms in Table 1 are used to describe the present invention.

TABLE 1

| Term | Definition |
|---|---|
| Activity | A grouping of Events that occurs within a Step. |
| Event | User and system generated occurrences. |
| Pend Description | Information related to a stopped Activity from being completed. |
| Status | State or condition of a sales order or Step in account implementation process. |
| Step | A stage in the lifecycle of an order. Each Step also has a status which can be viewed in the order tracking interface. Steps are linear and consist of Activities. |

Figure 1:
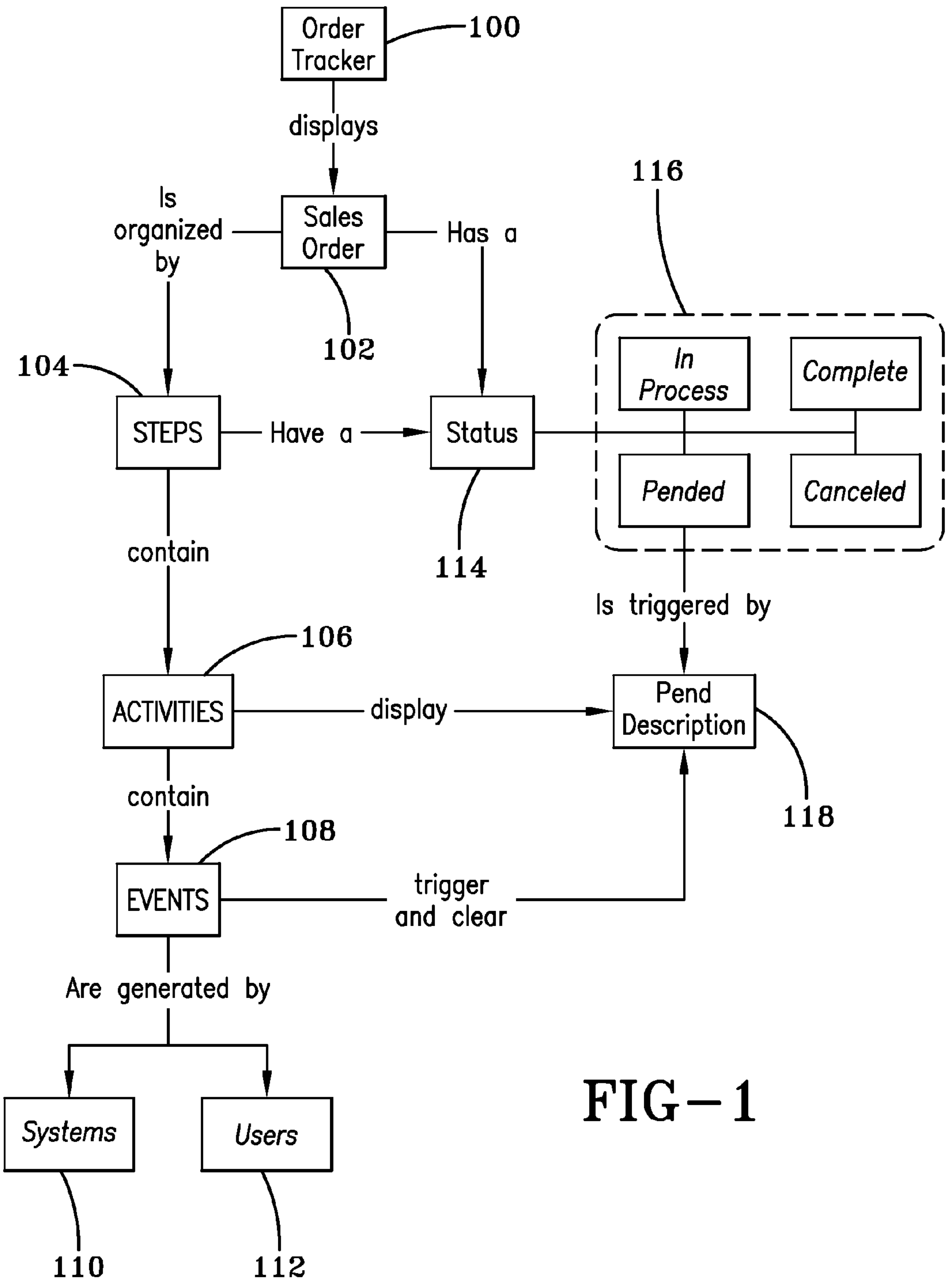
FIG. 1 is an entity relationship diagram for an example embodiment of the present invention.

Referring to FIG. 1, an entity relationship diagram for an example embodiment of the present invention is shown. The order tracking system of the present invention displays information about a sales order through a hierarchy of Events, Activities, and Steps as shown in FIG. 1. The order tracking system 100 displays sales orders 102 which comprise Steps 104. Steps 104, in turn, comprise Activities 108 which comprise Events 108. Events 108 are generated by internal business applications (systems) 110 and by users 112. Each Step 104 has a status indicator 114. The status indicators 116 include in process, complete, pended, or canceled. A status 114 is set when either an event or pend is triggered for any activity 106 contained within an associated step 104.

As an order goes through various internal business applications during processing, each application generates Events that trigger dates in the order tracking database. An Event is a system- or user-generated incident that occurs as an order for payment processing equipment and services is completed. In many instances, Events are one-time events in which the start and end dates are the same (e.g., paperwork received bit). However, they do not necessarily depict an exact timeline of the order or the operational process and may occur more than once for the same Activity. Events occur at both the sales order and terminal level.

Event types are the foundation of a hierarchy of information displayed by the order tracking system of the present invention. Events are generated by business applications and reported to an order tracking database. Each business application may continue to generate incidents that are recorded in other systems but not reported to the order tracking database. There are fewer Event types than there are incidents which may be recorded in business applications. Each Event type, therefore, is a significant milestone that occurs in the process of completing an order and pertains to the progression of a sales order through the order completion process. The order tracking system, therefore, collects and stores the information most likely to be of interest to the user base. The present invention provides a comprehensive view of the order status information that is most likely to be of interest to users such as sales agents or sales managers. The primary consumer of the order tracking system is the sales force. However, other vendor team members such as internal support groups may also have access to the information.

Events are triggered by either system or user-initiated actions. Event records are added to a queuing table (tbWorkQueue) in the order tracking database. These queued event records are properly processed in an automated queue processing program and stored in the OrderTracking tbOrderEvent table. An Event may be triggered by more than one business application. Each Event comprises an Event Type Identifier (ID), a start date (or first occurrence) and an end date (or last occurrence). When an Event is first established, both the start and end dates are the same. When another occurrence of the same Event takes place, the end date is updated.

Business applications use a stored procedure (uspAddEvent) to add trigger events and add them to queuing table (tbWorkQueue) where an order tracking automation or queue processor evaluates and processes the events using a stored procedure (uspQProcessEvent) and adds them to the order tracking database thus updating the progress of an order in the order tracking interface. Events triggered multiple times update the ending date of the same event within the order tracking system.

The queue processor runs as a service, reads queued records, and takes action on them using stored procedures corresponding to the type (e.g., pend, event, etc.). In a few instances, a business application calls one of the queue processor's stored procedures directly. For example, a business application may call a uspCreateOrder stored procedure bypassing the queue and creating an order in the order tracking system. Details of these stored procedures are in Appendix A.

Notes may also be passed for Events. These are stored in OrderTracking tbEventNote table and processed by the same stored procedures that handle Events.

Activities mirror some of the internal business processes and feature different start and end dates. Terminal-level Activities may be displayed multiple times depending on the number of business locations in the order that will receive equipment and services. Activities may be active in concurrent Steps, which gives multiple Steps an "in process" status at the same time. The activities original start date remains the same but the end date can change as events continue to be triggered for an activity.

A Step is a stage an order goes through during the order completion process. Steps have their own status and consist of related Activities. They may be completed when the last Activity started for a Step has an end date. Steps provide a perspective of the entire order, while Activities allow a user to drill-down and review all associated events.

A Step begins when a start date is set for it which occurs when an Event within an Activity, within that Step is triggered. Each Step comprises Activities that also begin when start dates are set. Closing Events are tied to end dates for Activities. When all of the Activities that were started have end dates, then an end date is also set for that Step. When all Activities associated with a Step are completed, the Step is completed. Some Steps may be skipped for orders such as when an existing customer does not require equipment.

Activities may be pended, which sets a Pended status icon for the effected Step. This action does not prevent other Activities from taking place either in the same step or upcoming steps, which is especially important for multiple location and terminal deals. A Pended Activity is not completed until the corresponding Pend Reason is resolved (i.e., the end date set), which means that the Steps status icon remains pended.

If an Activity has been assigned a status of Pend, a Pend icon is displayed to the right of the Activity's detail. An Activity (and the Step) is not completed until the Pended Reason is resolved by having an end date set.

Referring to FIG. 2, an order status report display for an example embodiment of the present invention is shown. The display comprises date information relevant to the report 200, information about a relevant sales area 202, and details about each sales order, merchant store name, order entry date, order installed date, paid date, ship date, and other payment information 204. Data for multiple orders are provided 206.

An option for accessing the order tracking system may appear on a home page for a report business application or other business application. Upon selecting the access option, an advanced search page of the order tracking system appears in a new web page. The order tracking system of the present invention also may be accessed from other business applications that display a sales order number such as a report that displays orders placed by a particular sales agent as shown in FIG. 2. The sales order number may be represented as a hyperlink 208. When the hyperlink 208 is selected, an order status page in the order tracking interface for the selected order is displayed.

Figure 3:
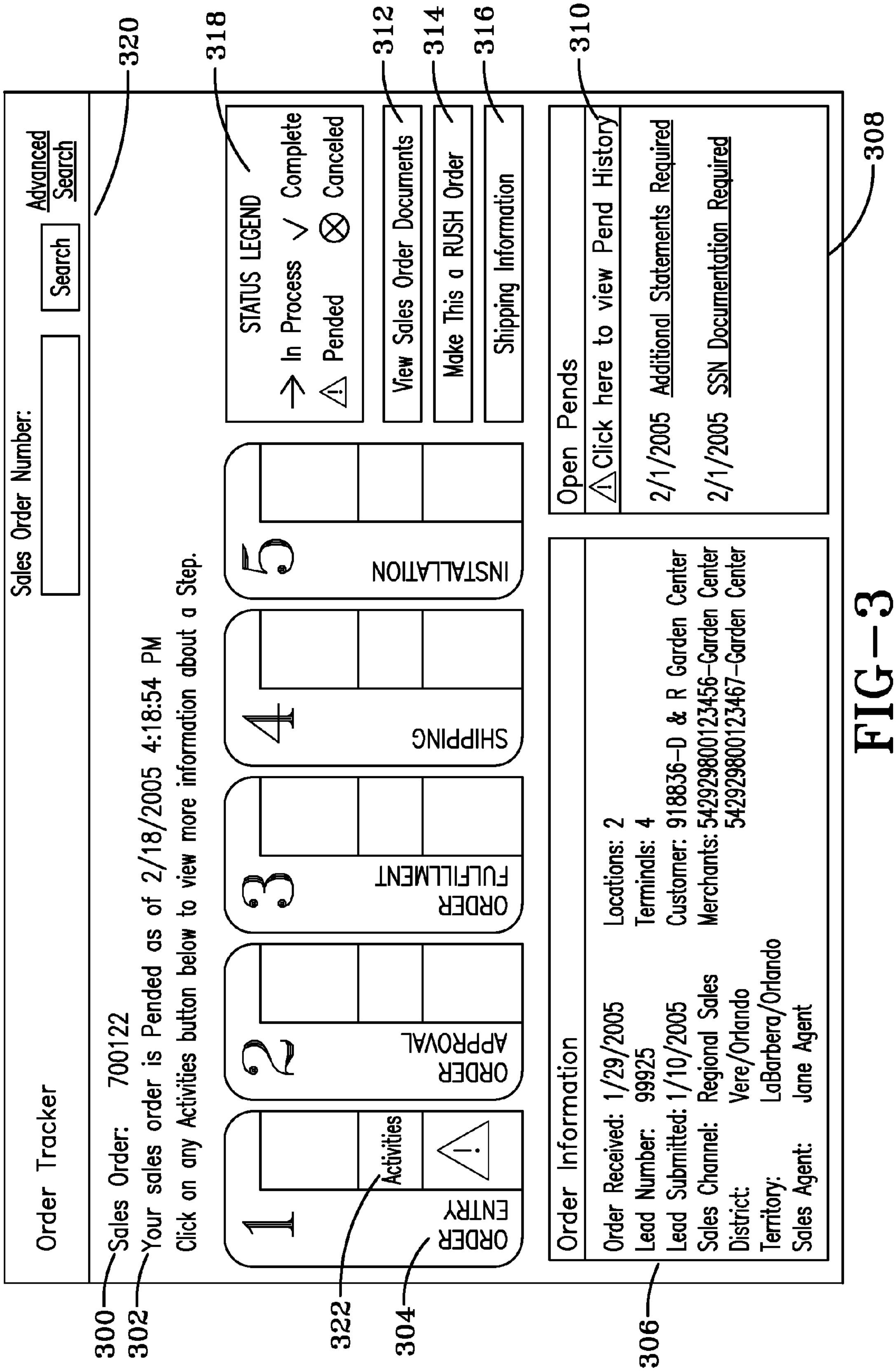
FIG. 3 is an order status page display for an example embodiment of the present invention.

Referring to FIG. 3, an order status page display for an example embodiment of the present invention is shown. The order status page retrieves information for a selected sales order, evaluates the current status of the order, and displays all of this information using graphics and text.

The order status page has the following features as described in Table 2:

TABLE 2

| Feature | Business Rules/Notes |
|---|---|
| Sales Order Number 300 | Sales order number as specified by the user or a hyperlink into the order tracking system that matches the SO_Number field in the tbOrder table |
| Order Status 302 | Order tracking system evaluates Steps and presents correct description and current time stamp |
| Steps Status Icons 304 | Order tracking system evaluates Step end dates, open pends and other specific events and displays appropriate status icons for each Step. Steps are "order entry," "order approval," "order fulfillment," "shipping," and "installation." |
| Order information 306 | Populates fields from tbOrder and tbLocation tables |
| Open Pends Box 308 | Lists Pend Descriptions that do not have end dates for the sales order |
| Pend History Option 310 | Option that opens the Pend History report when selected |
| View Sales Order Documents Option 312 | Option that opens the Sales Order Documents page when selected |
| Make this a RUSH Order Option 314 | Option that opens the Rush Order page when selected |
| Shipping Information Options 316 | Option that opens the Shipping Information report when selected |
| Status Legend 318 | Identifies icons associated with each status type |
| Advanced Search Option 320 | Link to the Advanced Search report filter |

The overall status of the order appears at the top of the page 302. Referring to FIG. 4, a status indicator display for an example embodiment of the present invention is shown. The top of the display provides the overall status 400. The list provides details about each status type and icon that may be associated with an order 402.

Referring to FIG. 5, a step status display for an example embodiment of the present invention is shown. The step status display may appear on other pages such as an order status page display as shown in FIG. 3. Each step has its own status icon and unique image (as explained in FIG. 4) to help quickly distinguish it 500. An explanation of the step statuses is shown in Table 3.

TABLE 3

| Step Status | What it means | System Notes |
|---|---|---|
| Empty - No Activity | There hasn't been any activity for the step; an upcoming step. | There are no start dates for the Step or any Activities associated with the Step. |
| In Process | Step and associated activities are in process. | Start date for the Step exists and some Activities may have start and end dates, but at least one Activity has only a start date. |
| Pended | Step has been stopped due to a pended activity. | Start date for the Step exists and at least one Activity with a start date has an associated Pended Reason without an end date. Pended status may be cleared when the end date for all Pended Reasons for that Step are established. |
| Completed | Step and all associated activities are completed. | End date for the step has been established and all activities that were started, including any pended reasons, also have end dates. |
| Canceled | Order is no longer being processed. | Review Steps to see the last step in the order before it was withdrawn or canceled. |

Figure 6:
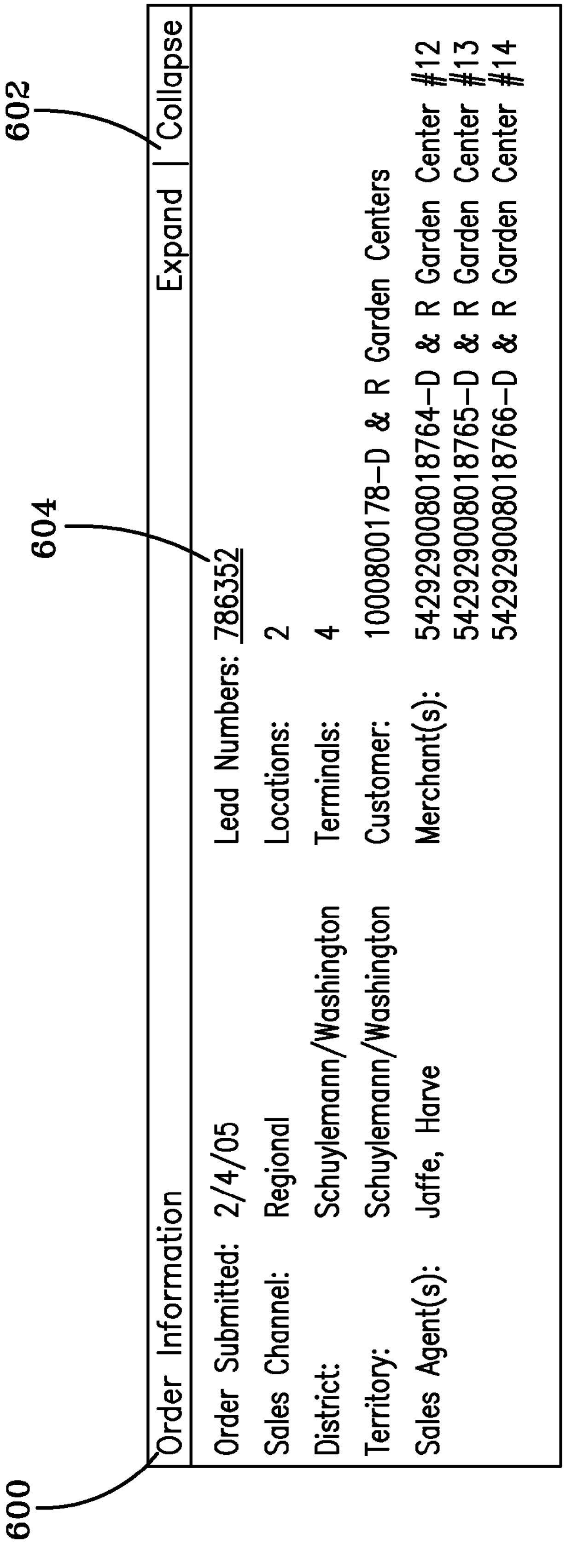
FIG. 6 is an order information box display for an example embodiment of the present invention.

Referring to FIG. 6, an order information box display for an example embodiment of the present invention is shown. The order information box display 600 may appear on an order status page display as shown in FIG. 3. It may appear under the steps icons on the order status page and it may be displayed at the top of each step page. If information is not currently available, the box may be empty. It may further comprise an expand and collapse feature 602 in which the order information box is, by default, expanded on the order status page and collapsed on each step page.

Selection of a hyperlinked lead number 604 in an order information box opens a lead information page comprising the details as shown in Table 4 from the order tracking database.

TABLE 4

| Field Name | Description | Table.Column |
|---|---|---|
| Order Submitted | Date Order was submitted by OLA to AIM. | tbOrder.SubmitDate |
| Sales Channel | Sales Channel Name | Display the Sales Channel Description field from the Sales Channel table by using the value in tbOrder.SalesChannel |
| District | District Office Name | Use tbOrder.DistrictID to get description from SalesApp |
| Territory | Territory Office Name | Use tbOrder.TerritoryID to get description from SalesApp |
| Sales Agent | Sales Agent Name | Use tbOrder.SalesAgent to get the sales agent's name from SalesApp |
| Lead Number | Number assigned to the lead when it is approved. | Derive lead number values from the SalesApp based on SO_Number for hyperlink use in the order tracking interface. |

TABLE 4-continued

| Field Name | Description | Table.Column |
|---|---|---|
| Locations | Total number of locations on order. | Sum of number of locations, for SO_Number, stored in tbOrderLocation |
| Terminals | Total number of terminals on order. | tbOrder.TerminalCnt |
| Customer | Customer Number and Legal Name of customer | Concatenate tbOrder.CustomerNbr and tbOrder.CustName (separate with hyphen) |
| Merchant | Merchant Number (if available) and DBA/Store Name. | Concatenate tbLocation.MerchantNbr and tbLocation.MerchantName (separate with hypen and list singly). |

Referring again to FIG. 3, selecting an activities option on the order status page opens a step page for the selected step. Steps for an example embodiment of the present invention include Order Entry, Order Approval, Order Fulfillment, Shipping, and Installation. Each step page shows a collapsible order information box and a listing of activities and events for the selected step as shown in Table 5.

TABLE 5

| Field | Table Column | Business Rules/Notes |
|---|---|---|
| Activity | tbOrderActivity.-ActivityTypeID | Where StepTypeID = selected Step page; display the description from tbOrdersActivityDefinition.Description for the ActivityTypeID |
| Store Name | tbOrderActivity.LocationNum | Display the Merchant Name where tbOrderActivity.LocationNum = tbOrderLocation.LocationNum |
| Terminal ID | tbOrderActivity.TerminalID | Display if available |
| Tracking Number | tbOrderEvent.TrackingNbr | Field is valid for Shipping Step page |
| Event | tbOrderEvent.Event TypeID | Display the description from tbOrderEventDefinition for EventTypeID. |
| Start Date | tbOrderActivity.StartDate tbOrderEvent.StartDate | Display appropriate start date for activities and events |
| End Date | tbOrderActivity.EndDate tbOrderEvent.EndDate | Display appropriate end date for activities and events |
| Notes | tbEventNote.NoteText | Display Note icon for any Event row that has an Event Note in tbEventNote. When selected, display NoteText in pop-up window. |

Referring to FIG. 7, an order entry step page display for an example embodiment of the present invention is shown. The top of the display comprises the sales order number 700, an identifier for the step (Order Entry) 702, a table with the fields identified in Table 5 (Activity, Store Name, Terminal ID, Tracking Number, Event, Start Date, End Date, and Notes) 704, and applicable data for each of the fields. As shown in FIG. 7, activities that occur during the order entry step include data entry 706 and quality control 708. Data entry 706 events include order received, applications for new account, and new account activations. Quality control 708 events include review of customer processing agreement (CPA) data (paperwork for products and services signed by merchant), pictures received, financials received, lease received, statements received, CPA pages received, and lease check received.

Referring to FIG. 8, an order approval step page display for an example embodiment of the present invention is shown. The top of the display comprises the sales order number 800, an identifier for the step (Order Approval) 802, a table with the fields identified in Table 5 (Activity, Store Name, Terminal ID, Tracking Number, Event, Start Date, End Date, and Notes) 804, and applicable data for each of the fields. As shown in FIG. 8, activities that occur during the order approval step include pricing 804, underwriting 808, merchant verification 810, and funds processed 812. As shown in FIG. 8, each of the activities comprises a plurality of events.

Referring to FIGS. 9A and 9B, an order fulfillment step page display for an example embodiment of the present invention is shown. Referring to FIG. 9A, the top of the display comprises the sales order number 900, an identifier for the step (Order Fulfillment) 902, a table with the fields identified in Table 5 (Activity, Store Name, Terminal ID, Tracking Number, Event, Start Date, End Date, and Notes) 904, and applicable data for each of the fields. As shown in FIG. 9A, activities that occur during the order fulfillment step include terminal setup for multiple terminals 906, 908 on different days and referring to FIG. 9B, deployment of the terminals 910, 912 on different days. As shown in FIGS. 9A and 9B, each of the activities comprises a plurality of events.

Referring to FIGS. 10A and 10B, a shipping step page display for an example embodiment of the present invention is shown. Referring to FIG. 10A, the top of the display comprises the sales order number 1000, an identifier for the step (Shipping) 1002, a table with the fields identified in Table 5 (Activity, Store Name, Terminal ID, Tracking Number, Event, Start Date, End Date, and Notes) 1004, and applicable data for each of the fields 1006, 1008 (FIG. 10B). As shown in FIGS. 10A and 10B, activities that occur during the shipping step include shipping of multiple terminals on different days. As shown in FIGS. 10A and 10B, each of the activities comprises a plurality of events.

Figure 11A:
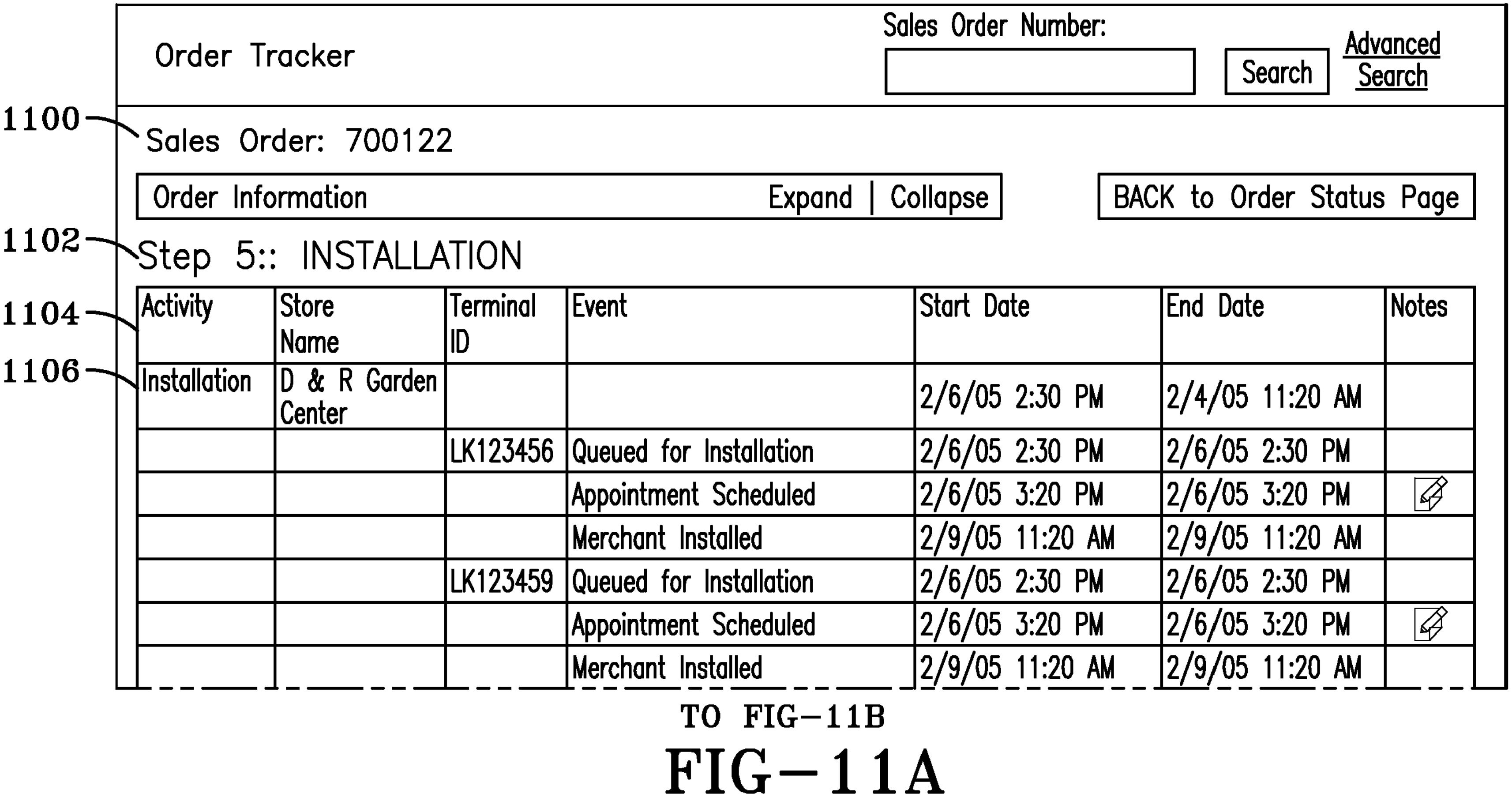

Referring to FIGS. 11A and 11B, an installation steps page for an example embodiment of the present invention is shown. Referring to FIG. 11A, the top of the display comprises the sales order number 1100, an identifier for the step (Installation) 1102, a table with the fields identified in Table 5 (Activity, Store Name, Terminal ID, Tracking Number, Event, Start Date, End Date, and Notes) 1104, and applicable data for each of the fields. As shown in FIG. 11, activities that occur during the installation step include installation on different days of vendor equipment for payment processing 1106, 1108 (FIG. 11B) and training 1110, 1112 (FIG. 11B) on different days. As shown in FIGS. 11A and 11B, each of the activities comprises one or more events.

The features and functionality of the present invention are accomplished by communications between various computer applications. As indicated previously, multiple internal business applications transmit data to the order tracking database where it is recorded for later retrieval. Business applications are modified to provide data according to the following implementation details.

When an order is suspended, by either a system-generated or user-initiated action, a business application establishes a Pend Type ID, for a specified activity, placing an event record in the queuing table (OrderTracking.tbWorkQueue) using a stored procedure that initiates the suspension (uspStartPend). The queue processor interrupts the requested suspension and places a record into the pend table (OrderTracking.tbPend). Pends are related to activities, which relate to internal business processes. An indicator of "Pend" means the activity is suspended. Multiple activities may be suspended at the same time; conversely, a single activity may be pended multiple times.

Users may exercise their discretion in selecting Pend types. Business rules are established for each business application to determine which Pends types to make available to the user.

Business applications may choose to automate specific Pend Types based on the individual system's business rules.

Pends are generic in nature. Therefore, an Activity type ID is identified for the order tracking system to suspend the correct activity. When a business application sets a Pend Type ID for an order, the order is displayed as Pended in the order tracking system, but events may continue to occur. These events do not have a relationship with the Pend Type ID. Each business application also decides when to clear Pends.

Pend notes are stored in the OrderTracking.tbPendNote table. Notes may be updated without having to establish a new Pend Type or adding an end date.

To create a Pend, business applications establish a Pend Type ID, for a specified activity, placing a record in the queuing table (OrderTracking.tbWorkQueue) using a stored procedure that initiates the suspension (uspStartPend). The queue processor interrupts the requested suspension and places a record into the pend table (OrderTracking.tbPend). To clear a Pend, one of two stored procedures (uspEndPend, or uspEndPendByID) is called. These stored procedures place an ending pend action record into the queuing table for action by the order tracking automation processor. These records command the processor to place an ending date for the pend, either by an identifier or other identifying pieces of information, into the tbPend table for the appropriate pend thereby clearing it.

Referring to FIG. 12, an open pends box display for an example embodiment of the present invention is shown. The open pends box may be accessed from an order status page open pends box option as shown in FIG. 3. The open pends box (308 of FIG. 3) provides a quick way for users to view all of the open pends that are suspending the order from progressing through the order completion process. Selecting any of the hyperlink open pend descriptions in the box opens the pend history report with the pend note expanded for the selected pend. The pend history report (310 of FIG. 3) is a cumulative list of all pended reasons for an order and the start and end dates. If a pended description does not have an end date, it is an open pended reason item. It tracks the history of open and closed pends for a sales order. It is accessed from an open pends list or a pend icon on a Steps page. Open pends do not have end dates while closed or "cleared" pends do.

Referring to FIGS. 13A and 13B, a pend history report display for an example embodiment of the present invention is shown. Referring to FIG. 13A, the top of the display comprises the sales order number 1300 and an identifier for the page 1302. A table comprising the following fields is displayed 1304: step, activity, pend reason, store name, terminal ID, start date, end date, status, and note. Data for each of the fields is then displayed 1306. Details related to a particular pend's history appear at the bottom of the display 1308 as shown in FIG. 13B.

Referring to FIG. 14, a shipping information report display for an example embodiment of the present invention is shown. The shipping information in the report shows all shipping incidents related to a sales order. The sales order is identified at the top of the display 1400 along with an identifier for the page 1402. Data for fields location, ship date/time, tracking number, equipment, and serial number 1404 are also displayed.

Referring to FIG. 15, an advanced search filter display for an example embodiment of the present invention is shown. The advanced search filter allows users to search for multiple sales orders. Features and functionality provided in the advanced search filter are outlined in Table 6.

TABLE 6

| Criteria | Business Rules |
|---|---|
| Report Level 1500 | A selection is required, but defaults to the highest possible level. Order tracking system uses the same security as the Sales Reports and limits access to various levels of reporting Regions, Districts, Territories, and Agents based on User ID. |
| Filters 1502 | User selects the checkbox to enable a filter, and then selects a value from the corresponding drop-down list.<br>Users may combine filters to narrow a search.<br>Submit Date<br>By default, START and END dates are populated with current date in both fields.<br>User specifies a START and END date to create a date range filter. If this filter is selected, the result set is limited to orders submitted within the specified date range for the selected Report Level. A valid date is selected. The system does not allow the user to select a date from the calendar tool that is greater than the current date.<br>Order Status<br>User may choose to select an order-level status to filter the result set.<br>If this filter is selected, return only orders that currently match the selected status for the selected Report Level and date range (if selected). The available Order Status values are:<br>Canceled<br>Complete<br>In Process<br>Pended<br>If this filter is not selected, the system returns Orders with ANY status for the selected Report Level, date range, and Key Value (if selected).<br>Key Value<br>A "Key Value" is a general category that includes identification numbers or descriptions.<br>"Key" narrows search results to records matching the information provided by the user.<br>Key Values include:<br>Key Value — Validation Rules<br>Customer (or Legal) Name — Alphanumeric; allow special characters.<br>Customer Number — Numeric; 10 digits.<br>Group Name — Alphanumeric; allow special characters.<br>Group Number — Numeric.<br>Lead Number — Numeric.<br>Merchant (or Store) Name — Alphanumeric; allow special characters.<br>Merchant Number — Numeric; 15 digits.<br>Sales Order Number — Numeric. Return record(s) that match specified sales order (regardless of status and/or date range). If sales order is not assigned to that Sales Agent 1, Sales Agent 2 or Sales Agent 3, display an error message. If the sales order is not assigned to that District or Territory, display an error message.<br>Terminal ID — Alphanumeric.<br>If this flter is selected, return orders matching the specified Key Value for the selected Report Level, Date Range, and Order Status (if selected). If this filter is not selected, return all orders for that Report Level, Date Range (if selected), and Order Status (if selected). |

Referring to FIG. 16, a search results page for an example embodiment of the present invention is shown. Order information is returned in a search results page. Identifying information is displayed at the top of the page 1600. The specified search criteria used to perform the search is displayed on the results page. Users may choose to revise the search or generate a new one. Descriptions of the fields 1602 are provided in Table 7. Search result data is displayed for the various fields 1604.

TABLE 7

| Column Name | Description | Business Rules/Notes | Example |
|---|---|---|---|
| Status | Icon that depicts the current status of an order | Display appropriate graphic for the SO_Numbers StatusTypeID in tbOrder. |  |
| Submit Date | Date OLA submitted to and received by company. | | Mar. 14, 2005 |
| Sales Order | Sales Order Number | Display value for OrderTracking.tbOrder.SO_Number for records that match inquiry. | 798654 |
| Customer Nbr | 10-digit external Customer Number | Display value from tbOrder.CustomerNbr. | 1000896321 |
| Customer Name | Principal or Legal Name of the Customer | Display text from tbOrder.CustName. | Donuts, Inc. |
| Merchant Nbr | 15-digit external Merchant Number | Display value from tbOrderLocation.MerchantNbr if available. | 5429290090-93584 |
| Store Name | Merchant or "DBA" Description | Create new row for each Location. Always display Store Name on same row as corresponding Merchant Nbr. | Matt's Donuts |
| Sales Agent | Sales Agent ID of the agent who sold the deal | Use OrderTracking.tbOrder.SalesAgentID | 17270 |
| Email | Icon used by Sales agent to send an email message to company support representatives | Emails Sales Support with Subject line populated with the SO_Number. Use current email support functionality in SalesApp. |  |

Details of the order tracking database are described in the tables 8-16. Table 8 provides a list of tables for an example embodiment of the present invention.

TABLE 8

| Table Name | Description |
|---|---|
| tbAction | Stores a list of actions that correlate to actions available in the order tracking automation processor. |
| tbOrder | Stores Sales Order Number, Order-level status, Customer and Sales Agent info. |
| tbOrderLocation | Stores Location Number and Merchant info. |
| tbOrderEquipment | Stores Location Number, Equipment Number and Terminal ID. |
| tbStatusDefinition | Lookup table for status descriptions. |
| tbSystemDefinition | Lookup table for external system descriptions. |
| tbOrderStep | Stores Step-level start and end dates for an order. |
| tbOrderStepDefinition | Lookup table for Step descriptions. |
| tbOrderActivity | Stores Activity-level Start and End dates. |
| tbOrderActivityDefinition | Lookup table for Activity descriptions; relates Activities to Steps. |
| tbOrderEvent | Stores business application Events, including start and end dates. |
| tbOrderEventDefinition | Lookup table for Event descriptions; relates Events to Activities. |
| tbEventNote | Stores Note Text for an Event record. |
| tbPend | Stores any Pend Reasons for an order. |
| tbPendDefinition | Lookup table for Pend descriptions; relates Pends to Activities. |
| tbPendNote | Stores Note Text for a Pend record. |

TABLE 8-continued

| Table Name | Description |
|---|---|
| tbWorkQueue | Table that contains records of all actions to be performed on the order tracking system as requested by other business applications. |
| tpCarrier | Stores a carrier ID, description and correlating URL to a shipping carrier's website. |

The following values are added to the lookup table tbStatusDefinition.

TABLE 9

| StatusTypeID | Description |
|---|---|
| 1 | In Process |
| 2 | Complete |
| 3 | Cancelled |
| 4 | Pended |

The following values are added to the lookup table tbSystemDefinition. These are the System IDs that are passed with trigger events by business applications.

TABLE 10

| SystemID | Description | |
|---|---|---|
| 1 | AIM | Account Implementation Management—system for providing internal employees information to setup a customer with new products or services |
| 2 | AUS | Automated Underwriting System—system for determining the level of risk for a new merchant |
| 3 | CMS | Company Merchant Services—sales and employee tracking utility for the purposes of determining employee compensation |
| 4 | Shipping | System for managing and tracking shipments of products and equipment to merchants |
| 5 | Sales System | System for managing sales of products and services to new merchants |
| 6 | OLA | Online Application—application for providing sales force with information on new merchants |
| 7 | DIFT | Document Image Filing Tool—application for use by internal employees to store images of sales documents provided to merchants |
| 8 | CIS/STAR | Customer Information System/Service Tracking and Reporting—merchant information and support systems applications |
| 9 | GC Admin | GiftCard Administration—application for initiating acceptance of gift cards by merchants |
| 10 | RC Admin | RewardsCard Administration—application for initiating acceptance of reward cards by merchants |

The following values are added to the lookup table tbOrderStepDefinition.

TABLE 11

| StepTypeID | Description | Ordinal |
|---|---|---|
| 1 | Order Entry | 1 |
| 2 | Order Approval | 2 |
| 3 | Order Fulfillment | 3 |
| 4 | Shipping | 4 |
| 5 | Installation | 5 |

The following values are added to the lookup table tbOrderActivityDefinition.

TABLE 12

| Activity TypeID | Description | StepTypeID | DisplayLevel | OrderLevel |
|---|---|---|---|---|
| 1 | Order Submitted | 1 | 1 | 1 |
| 2 | Quality Control | 1 | 2 | 1 |
| 3 | Pricing | 2 | 1 | 1 |
| 4 | Underwriting | 2 | 2 | 1 |
| 5 | Merchant Verification | 2 | 3 | 1 |
| 6 | Funding and Paperwork | 2 | 4 | 1 |
| 7 | Terminal Setup | 3 | 1 | 0 |
| 8 | Deployment | 3 | 2 | 0 |
| 9 | Shipping | 4 | 1 | 0 |
| 10 | Installation | 5 | 1 | 0 |
| 11 | Training | 5 | 2 | 0 |

Order Level:

0=Not Sales Order Level (i.e., Terminal or Location)

1=Sales Order Level

The following values are added to the lookup table tbOrderEventDefinition.

TABLE 13

| Event Type ID | Activity Type ID | Description | Is Closing Event | Is Cancellation Event | Is Reinstatement Event |
|---|---|---|---|---|---|
| 1 | 1 | Online Application Submitted | 1 | 0 | 0 |
| 2 | 1 | Applied for New Vendor 1 | 0 | 0 | 0 |
| 3 | 1 | Applied for New Vendor 1 REV PIP | 0 | 0 | 0 |
| 4 | 1 | Applied for New Vendor 2 | 0 | 0 | 0 |
| 5 | 1 | Registered for Existing Vendor 1 | 0 | 0 | 0 |
| 6 | 1 | Registered for Existing Vendor 1 REV PIP | 0 | 0 | 0 |
| 7 | 1 | Registered for Existing Vendor 2 | 0 | 0 | 0 |
| 8 | 1 | New Account Activated by Vendor 1 | 1 | 0 | 0 |
| 9 | 1 | New Account Activated by Vendor 2 | 1 | 0 | 0 |
| 10 | 1 | Existing Account Registered by Vendor 1 | 1 | 0 | 0 |
| 11 | 1 | Existing Account Registered by Vendor 2 | 1 | 0 | 0 |
| 12 | 1 | Application Declined by Vendor 1 | 1 | 0 | 0 |
| 13 | 1 | Application Declined by Vendor 2 | 1 | 0 | 0 |
| 14 | 1 | GiftCard Order Placed | 0 | 0 | 0 |
| 15 | 1 | GiftCard Order Sent to Manufacturer | 0 | 0 | 0 |
| 16 | 1 | GiftCard Order Canceled | 1 | 0 | 0 |
| 17 | 1 | RewardsCard Order Placed | 0 | 0 | 0 |
| 18 | 1 | RewardsCard Order Sent to Manufacturer | 0 | 0 | 0 |
| 19 | 1 | RewardsCard Order Canceled | 1 | 0 | 0 |
| 20 | 2 | Order reviewed by Quality Control | 1 | 0 | 0 |
| 21 | 6 | Additional Services Form Received | 0 | 0 | 0 |
| 22 | 6 | Business License Received | 0 | 0 | 0 |
| 23 | 6 | CPA Pages 1 and 2 Received | 0 | 0 | 0 |
| 24 | 6 | Financials Received | 0 | 0 | 0 |
| 25 | 6 | Funding Received | 0 | 0 | 0 |
| 26 | 6 | Lease Received | 0 | 0 | 0 |
| 27 | 6 | Check Addendum Received | 0 | 0 | 0 |
| 28 | 6 | Petroleum Addendum Received | 0 | 0 | 0 |
| 29 | 6 | External Pictures Received | 0 | 0 | 0 |
| 30 | 6 | Previous Processor Statements Received | 0 | 0 | 0 |
| 31 | 6 | Rental Agreement Received | 0 | 0 | 0 |
| 32 | 6 | SSN Documentation Received | 0 | 0 | 0 |
| 33 | 6 | WEX Application Received | 0 | 0 | 0 |
| 34 | 6 | 3 Tier Cost Plus Addendum Received | 0 | 0 | 0 |
| 35 | 6 | Required Document Waived | 0 | 0 | 0 |
| 36 | 6 | Additional Paperwork Required | 0 | 0 | 0 |
| 37 | 3 | Rates/Fees Incorrect | 0 | 0 | 0 |
| 38 | 2 | Withdrawn by Quality Control | 1 | 1 | 0 |
| 39 | 3 | Rates Approved by Pricing Committee | 1 | 0 | 0 |
| 40 | 3 | Rates Declined by Pricing Committee | 1 | 0 | 0 |
| 41 | 3 | Withdrawn by Pricing Committee | 1 | 1 | 0 |
| 42 | 4 | Sent to Underwriters | 0 | 0 | 0 |
| 43 | 4 | MATCH Information Requested | 0 | 0 | 0 |
| 44 | 4 | Credit Score Requested | 0 | 0 | 0 |
| 45 | 4 | OFAC Information Requested | 0 | 0 | 0 |
| 46 | 3 | Rates/Fees Correct | 1 | 0 | 0 |
| 47 | 4 | Approved by Underwriting | 1 | 0 | 0 |
| 48 | 4 | Declined by Underwriting | 1 | 0 | 0 |
| 49 | 4 | Withdrawn by Underwriting | 1 | 1 | 0 |
| 50 | 5 | Called Merchant | 0 | 0 | 0 |
| 51 | 5 | Scheduled Appointment | 0 | 0 | 0 |
| 52 | 5 | Verified Merchant | 1 | 0 | 0 |
| 53 | 9 | Withdrawn by Shipping | 1 | 1 | 0 |
| 54 | 6 | Internal Pictures Received | 0 | 0 | 0 |
| 55 | 7 | REMOVED: Merchant Number Assigned | 0 | 0 | 0 |
| 56 | 7 | Terminal ID Assigned | 0 | 0 | 0 |
| 57 | 7 | Packing Slip Sent to Distribution Center | 1 | 0 | 0 |
| 58 | 7 | Terminal Profile Built | 0 | 0 | 0 |
| 59 | 7 | REMOVED: Terminal Profile Updated | 0 | 0 | 0 |
| 60 | 7 | REMOVED: Check Digit Generated | 0 | 0 | 0 |
| 61 | 7 | Sent to Order Fulfillment | 1 | 0 | 0 |
| 62 | 7 | Withdrawn by Contracts Processing | 1 | 1 | 0 |
| 63 | 8 | Sent to Deployment | 0 | 0 | 0 |
| 64 | 5 | Sent to Verification | 0 | 0 | 0 |
| 65 | 8 | Packing Slip Printed in Deployment | 0 | 0 | 0 |
| 66 | 8 | Download Notice Generated | 0 | 0 | 0 |
| 67 | 8 | Equipment Pulled from Inventory | 0 | 0 | 0 |
| 68 | 8 | Reviewed by Deployment QC | 1 | 0 | 0 |
| 69 | 8 | Withdrawn by Deployment | 1 | 1 | 0 |
| 70 | 9 | Order Ready for Shipment | 0 | 0 | 0 |
| 71 | 9 | Order Packed | 0 | 0 | 0 |
| 72 | 9 | Tracking Number Assigned | 0 | 0 | 0 |
| 73 | 9 | Waiting for Carrier Pickup | 0 | 0 | 0 |
| 74 | 9 | GiftCard Order Shipped By Manufacturer | 0 | 0 | 0 |
| 75 | 9 | RewardsCard Order Shipped By Manufacturer | 0 | 0 | 0 |

TABLE 13-continued

| Event Type ID | Activity Type ID | Description | Is Closing Event | Is Cancellation Event | Is Reinstatement Event |
|---|---|---|---|---|---|
| 76 | 9 | Order Picked up by Carrier | 1 | 0 | 0 |
| 77 | 10 | Card Processing Installation Ready | 0 | 0 | 0 |
| 78 | 10 | Onsite Installation Ready | 0 | 0 | 0 |
| 79 | 10 | MSP Installation Ready | 0 | 0 | 0 |
| 80 | 10 | VAR Installation Ready | 0 | 0 | 0 |
| 81 | 10 | Called Merchant | 0 | 0 | 0 |
| 82 | 10 | Scheduled Appointment | 0 | 0 | 0 |
| 83 | 10 | Merchant Installed | 1 | 0 | 0 |
| 84 | 10 | Lease Sent to Golden Eagle | 0 | 0 | 0 |
| 85 | 10 | AE Certified Installation | 0 | 0 | 0 |
| 86 | 11 | Merchant Trained by CI | 1 | 0 | 0 |
| 87 | 11 | Merchant Trained by Agent | 1 | 0 | 0 |
| 88 | 10 | Withdrawn by Installation | 1 | 1 | 0 |
| 89 | 2 | Order Ready for Quality Control | 0 | 0 | 0 |
| 90 | 2 | Order Ready for ISG Quality Control | 0 | 0 | 0 |
| 91 | 2 | Note from Quality Control | 0 | 0 | 0 |
| 92 | 2 | Note from ISG | 0 | 0 | 0 |
| 93 | 3 | Note from Pricing Committee | 0 | 0 | 0 |
| 94 | 5 | Note from Verification | 0 | 0 | 0 |
| 95 | 7 | Note from Contracts Processing | 0 | 0 | 0 |
| 96 | 8 | Note from Distribution Center | 0 | 0 | 0 |
| 97 | 9 | Note from Distribution Center | 0 | 0 | 0 |
| 98 | 10 | Note from Central Installations | 0 | 0 | 0 |
| 99 | 6 | All Required Docs Received | 1 | 0 | 0 |
| 100 | 2 | Reinstated by Quality Control | 0 | 0 | 1 |
| 101 | 3 | Reinstated by Pricing Committee | 0 | 0 | 1 |
| 102 | 4 | Reinstated by Underwriting | 0 | 0 | 1 |
| 103 | 9 | Reinstated by Shipping | 0 | 0 | 1 |
| 104 | 7 | Reinstated by Contracts Processing | 0 | 0 | 1 |
| 105 | 8 | Reinstated by Deployment | 0 | 0 | 1 |
| 106 | 10 | Reinstated by Installation | 0 | 0 | 1 |

The following values are added to the lookup table tbPendDefinition. Any of these pend descriptions may be selected by an end user to pend or hold an order during the order completion process. Business applications specify the ActivityTypeID based on trigger events when creating a pend record in tbPend.

TABLE 14

| PendTypeID | Description |
|---|---|
| 1 | Documents Unreadable:Business License |
| 2 | Documents Unreadable:CPA Pages 1 & 2 |
| 3 | Documents Unreadable:Financials |
| 4 | Documents Unreadable:Lease |
| 5 | Documents Unreadable:Check Addendum |
| 6 | Documents Unreadable:Internal Pictures |
| 7 | Documents Unreadable:External Pictures |
| 8 | Documents Unreadable:Previous Processor Statements |
| 9 | Documents Unreadable:Rental Agreement |
| 10 | Documents Unreadable:SSN Documents |
| 11 | Documents Unreadable:WEX Application |
| 12 | Documents Unreadable:Additional Services Form |
| 13 | Documents Unreadable:3 Tier - Cost Plus Addendum |
| 14 | Paperwork Missing:Business License |
| 15 | Paperwork Missing:CPA Pages 1 & 2 |
| 16 | Paperwork Missing:Financials |

TABLE 14-continued

| PendTypeID | Description |
|---|---|
| 17 | Paperwork Missing:Lease |
| 18 | Paperwork Missing:Check Addendum |
| 19 | Paperwork Missing:Internal Pictures |
| 20 | Paperwork Missing:External Pictures |
| 21 | Paperwork Missing:Previous Processor Statements |
| 22 | Paperwork Missing:Rental Agreement |
| 23 | Paperwork Missing:SSN Documents |
| 24 | Paperwork Missing:WEX Application |
| 25 | Paperwork Missing:Additional Services Form |
| 26 | Paperwork Missing:3 Tier - Cost Plus Addendum |
| 27 | Funding Missing |
| 28 | Funding Incorrect |
| 29 | Data Issue |
| 30 | Contract Not Signed |
| 31 | Equipment/Software Issue |
| 32 | Sent to Pricing Committee |
| 33 | Unable to Verify Merchant |
| 34 | Sales Agent Must Contact Merchant |
| 35 | Unable to Contact Merchant |
| 36 | Incorrect Banking Information |
| 37 | Issues with Packing Slip |
| 38 | Card Type Not Active |
| 39 | Equipment Research |
| 40 | Check Service Configuration Issues |
| 41 | Invalid Shipping Address |
| 42 | Hold for Future Shipment |
| 43 | Underwriting:Financial Statements |
| 44 | Underwriting:Internal Pictures |
| 45 | Underwriting:External Pictures |
| 46 | Underwriting:Processor Statements |
| 47 | Underwriting:Business License |
| 48 | Underwriting:SSN Documents |
| 49 | Underwriting:Website Address |
| 50 | Underwriting:Product Sample/Brochure |
| 51 | Underwriting:Tax Filings |
| 52 | Underwriting:ID Verification |
| 53 | Underwriting:Merchant Interview |
| 54 | Underwriting:Management Review |
| 55 | Underwriting:Other |
| 56 | Awaiting AE Onsite Install |
| 57 | Awaiting AE Install |
| 58 | Rate Verification Error |
| 61 | Lead with No Lead Number |
| 62 | Underwriting:CPA Missing |
| 63 | Underwriting:Principal Title |
| 64 | Underwriting:Credit Risk |
| 65 | Underwriting:Detailed Business Description |
| 66 | Underwriting:Bankruptcy/Equipment Ownership |
| 67 | Underwriting:Parameters |

Information that defines an order is populated in OrderTracking.tbOrder by an order tracking system process when EventTypeID 1 is triggered for a sales order number (SO_Number).

Activities and steps are also created when this first event is established.

Additionally, the order tracking system process populates tbOrderLocation.LocationNumber table with location data for each location number identified in the OLA system for the same SO_Number.

When event ID 1 is triggered through the order tracking queue, the queue processor calls the create order stored procedure (uspCreateOrder) upon determining that the order does not exist in the table tbOrder.

TABLE 15

| Column Name | Specifications |
|---|---|
| SO_Number | Specified sales order number for Event ID 1 |
| StatusTypeID | Insert "1" |

TABLE 15-continued

| Column Name | Specifications |
|---|---|
| CustomerID | Customer ID retrieved from the online application (OLA). |
| CustomerNbr | Customer number retrieved from the OLA. |
| CustName | If the OLA system indicates this is a new customer and the customer's name and address information for address type 11 is available then retrieve it, otherwise, use the description of the customer from OLA's corporate data. |
| DistrictID | Identifying district number from OLA's sales agent data. |
| TerritoryID | Identifying territory number from OLA's sales agent data. |
| SalesAgentID | From OLA's sales agent data. |
| SalesChannel | Sales channel id from the OLA's sales agent data. |
| TerminalCnt | Store total number of unique Equipment IDs from the OLA.Equipment table. |
| Submit Date | Completed Time for SO_Number as retrieved from OLA. |
| LastStatus | A description of the last triggered event, or pended action. |

Additional Location information is populated in OrderTracking.tbOrderLocation by an order tracking system process when EventTypeID 1 is created in tbOrderEvent for a SO_Number.

Data is collected according to the specifications below.

TABLE 16

| Column Name | Specifications | Notes |
|---|---|---|
| LocationNumber | For the specified SO_Number retrieve location number from the OLA system when event ID 1 is triggered. | |
| SO_Number | Specified by the system triggering event ID 1. | |
| MerchantName | Retrieved with the location data from the OLA system for the specified SO_Number. | Same as the Store Name. |
| MerchantNbr | Retrieved with the location data from the OLA system for the specified SO_Number. | |

Additional implementation details for an example embodiment of the present invention are provided in Appendices A-D. Appendix A includes a description of procedures for an example embodiment of the present invention. Appendix B is a list of system trigger events for an example embodiment of the present invention. Appendix C is a list of pend types for an example embodiment of the present invention. Appendix D is a list of activity type definitions for an example embodiment of the present invention. The present invention provides sales agents and managers with a comprehensive view of an order's progression based on trigger events initiated by a plurality of business applications that support different phases of the order completion process.

While example embodiments of the invention have been illustrated and described, various modifications and combinations can be made without departing from the spirit and scope of the invention. Different trigger events as well as steps, activities, and events may be defined and fall within the scope of the present invention. Different views to data in the order tracking database may be developed and fall within the scope of the present invention. Modifications, combinations, and equivalents to the system and method of the present invention are intended to be covered and claimed.

APPENDIX A

| | |
|---|---|
| Stored Procedure Name | uspAddEvent |
| Description | Adds valid event information to the OrderTracking queuing table (tbWorkQueue) for processing by the OrderTracker queue processor, and storage with OrderTracker's event information in the tbOrderEvent table. |
| Method | <Insert method for calling this stored procedure> |
| Input Parameters | @ SONumber int,<br>@ LocationNum int,<br>@ EquipmentNum int,<br>@ EventTypeID int,<br>@ EventDate datetime,<br>@ User varchar(50),<br>@ System ID int,<br>@ Note varchar(255) = null,<br>@ TrackingNbr varchar(50) = NULL,<br>@ CarrierID int = NULL |
| Output (if any) | none |
| Return | none |
| Function | Adds the passed event information to the queuing table for processing into the OrderTracking system by the OrderTracker queue processor. |
| Stored Procedure Name | uspStartActivity |
| Description | Assigns the start date, system and user that started the activity. |
| Method | <Insert method for calling this stored procedure> |
| Input Parameters | @ SONumber int,<br>@ LocationNum int,<br>@ EquipmentNum int,<br>@ ActivityTypeID int,<br>@ SystemID int,<br>@ User varchar(50),<br>@ StartDate datetime |
| Output (if any) | none |
| Return | none |
| Function | Starts the activity based on SONumber, LocationNum, EquipmentNum, ActivityTypeID. If the associated step has not been started, the start date is assigned to the step for this activity. |
| Stored Procedure Name | uspEndActivity |
| Description | Assigns the end date, system and user that ended the activity. |
| Method | <Insert method for calling this stored procedure> |
| Input Parameters | @ SONumber int,<br>@ LocationNum int, |

APPENDIX A-continued

| | |
|---|---|
| | @ EquipmentNum int,<br>@ ActivityTypeID int,<br>@ SystemID int,<br>@ User varchar(50),<br>@ EndDate datetime |
| Output (if any) | none |
| Return | none |
| Function | Ends the activity based on SONumber, LocationNum, EquipmentNum, ActivityTypeID. If this is the last activity in a step, the end date is assigned to the step for this activity. |
| Stored Procedure Name | uspStartStep |
| Description | Assigns the start date to the step. |
| Method | <Insert method for calling this stored procedure> |
| Input Parameters | @ SONumber int,<br>@ StepTypeID int,<br>@ EndDate datetime |
| Output (if any) | none |
| Return | none |
| Function | Assigns the end date to the step for the specified SONumber. |
| Stored Procedure Name | uspEndStep |
| Description | Assigns the end date to the step. |
| Method | <Insert method for calling this stored procedure> |
| Input Parameters | @ SONumber int,<br>@ StepTypeID int,<br>@ StartDate datetime |
| Output (if any) | none |
| Return | none |
| Function | Assigns the start date to the step for the specified SONumber. If this is the last step in the order, the order is marked as completed. |
| Stored Procedure Name | uspCreateOrder |
| Description | Creates the shell of the order as well as populates order data |
| Method | <Insert method for calling this stored procedure> |
| Input Parameters | @ SONumber int |
| Output (if any) | none |
| Return | none |
| Function | Creates the order by retrieving order information and builds the shell of the order by calling other stored procedures. |
| Stored Procedure Name | uspCreateSteps |
| Description | Creates the empty steps for an order. |
| Method | <Insert method for calling this stored procedure> |
| Input Parameters | @ SONumber int |
| Output (if any) | none |
| Return | none |
| Function | Creates the steps for an order and then calls the uspCreateActivities stored procedure. |
| Stored Procedure Name | uspCreateActivities |
| Description | Creates the empty activities for each step in the order. |
| Method | <Insert method for calling this stored procedure> |
| Input Parameters | @ SONumber int |
| Output (if any) | none |
| Return | none |
| Function | Creates the activities for an order for all steps. |
| Stored Procedure Name | uspStartPend |
| Description | Adds valid pend information to the OrderTracking queuing table (tbWorkQueue) for processing by the OrderTracker queue processor, and storage with OrderTracker's pend information in the tbPend table. |
| Method | <Insert method for calling this stored procedure> |
| Input Parameters | @ SONumber int,<br>@ LocationNum int,<br>@ EquipmentNum int,<br>@ ActivityTypeID int,<br>@ PendTypeID int,<br>@ User varchar(50),<br>@ SystemID int,<br>@ StartDate datetime,<br>@ Note varchar(255) |
| Output (if any) | None |
| Return | None |
| Function | Adds the passed pend information to the queuing table for processing into the OrderTracking system by the OrderTracker queue processor. |
| Stored Procedure Name | uspEndPend |
| Description | Adds pend clearing information to the OrderTracking queuing table (tbWorkQueue) for processing by the OrderTracker queue processor for purposes of clearing an open pend. |
| Method | <Insert method for calling this stored procedure> |
| Input Parameters | @ SONumber int,<br>@ LocationNum int,<br>@ EquipmentNum int,<br>@ ActivityTypeID int,<br>@ PendTypeID int, |

APPENDIX A-continued

| | |
|---|---|
| | @ User varchar(50)<br>@ SystemID int,<br>@ EndDate datetime,<br>@ Note varchar(1000) |
| Output (if any) | None |
| Return Function | None |
| Stored Procedure Name | uspEndPendByID |
| Description | Adds valid pend information to the OrderTracking queuing table (tbWorkQueue) for processing by the OrderTracker queue processor for purposes of clearing an open pend. This information contains the ID of a specific system-generated pend. |
| Method | <Insert method for calling this stored procedure> |
| Input Parameters | @ SONumber int,<br>@ PendID int,<br>@ User varchar(50),<br>@ SystemID int,<br>@ EndDate datetime,<br>@ Note varchar(1000) |
| Output (if any) | None |
| Return Function | None |

APPENDIX B

System Triggered Events

| Event Type ID | Description | Business Applications | Trigger |
|---|---|---|---|
| 1 | Online Application Submitted | OLA | Item is submitted to AIM |
| 2 | Applied for New Vendor 1 | AIM | IMPEX applies for NEW Vendor 1; after CIS and LMS Exports |
| 3 | Applied for New Vendor 1 REV PIP | AIM | IMPEX applies for NEW Vendor 1 Rev PIP; after CIS and CMS Exports |
| 4 | Applied for New Vendor 2 | AIM | IMPEX applies for New Vendor 2; after CIS and CMS Exports |
| 5 | Registered for Existing Vendor 1 | AIM | IMPEX applies for Existing Vendor 1; after CIS and CMS Exports |
| 6 | Registered for Existing Vendor 1 REV PIP | AIM | IMPEX applies for Existing Vendor 1 Rev PIP; after CIS and CMS Exports |
| 7 | Registered for Existing Vendor 2 | AIM | IMPEX applies for Existing Vendor 2; after CIS and CMS Exports |
| 8 | New Account Activated by Vendor 1 | AIM | IMPEX returns activation notice from STAR |
| 9 | New Account Activated by Vendor 2 | AIM | IMPEX returns activation notice from STAR |
| 10 | Existing Account Registered by Vendor 1 | AIM | IMPEX returns activation notice from STAR |
| 11 | Existing Account Registered by Vendor 2 | AIM | IMPEX returns activation notice from STAR |
| 12 | Application Declined by Vendor 1 | AIM | IMPEX returns activation notice from STAR |
| 13 | Application Declined by Vendor 2 | AIM | IMPEX returns activation notice from STAR |
| 14 | GiftCard Order Placed | GC Admin | similar to STAR incident |
| 15 | GiftCard Order Sent to Manufacturer | GC Admin | similar to STAR incident |
| 16 | GiftCard Order Canceled | GC Admin | similar to STAR incident |
| 17 | RewardsCard Order Placed | RC Admin | similar to STAR incident |
| 18 | RewardsCard Order Sent to Manufacturer | RC Admin | similar to STAR incident |
| 19 | RewardsCard Order Canceled | RC Admin | similar to STAR incident |
| 20 | Order reviewed by Quality Control | AIM | Item is progressed out of any of the QC queues |
| 21 | Additional Services Form Received | DIFT | Received date is established in AIM.tbDocumentsReceived |
| 22 | Business License Received | DIFT | Received date is established in AIM.tbDocumentsReceived |
| 23 | CPA Pages 1 and 2 Received | DIFT | Received date is established in AIM.tbDocumentsReceived |
| 24 | Financials Received | DIFT | Received date is established in AIM.tbDocumentsReceived |
| 25 | Funding Received | DIFT | Received date is established in AIM.tbDocumentsReceived |
| 26 | Lease Received | DIFT | Received date is established in AIM.tbDocumentsReceived |

APPENDIX B-continued

System Triggered Events

| Event Type ID | Description | Business Applications | Trigger |
|---|---|---|---|
| 27 | Check Addendum Received | DIFT | Received date is established in AIM.tbDocumentsReceived |
| 28 | Petroleum Addendum Received | DIFT | Received date is established in AIM.tbDocumentsReceived |
| 29 | External Pictures Received | DIFT | Received date is established in AIM.tbDocumentsReceived |
| 30 | Previous Processor Statements Received | DIFT | Received date is established in AIM.tbDocumentsReceived |
| 31 | Rental Agreement Received | DIFT | Received date is established in AIM.tbDocumentsReceived |
| 32 | SSN Documentation Received | DIFT | Received date is established in AIM.tbDocumentsReceived |
| 33 | WEX Application Received | DIFT | Received date is established in AIM.tbDocumentsReceived |
| 34 | 3 Tier—Cost Plus Addendum Received | DIFT | Received date is established in AIM.tbDocumentsReceived |
| 35 | Required Document Waived | AIM, AUS | Item is "unchecked" in smart checkboxes |
| 36 | Additional Paperwork Requested | AIM, AUS | Item is "checked" in smart checkboxes |
| 37 | Rates/Fees Incorrect | AIM | Item fails Rate Verification; identify where the rates failed in Notes (QC, Underwriting, Merchant Verification) |
| 38 | Withdrawn by Quality Control | AIM | Item is Withdrawn in QC Group |
| 39 | Rates Approved by Pricing Committee | AIM | Rates are forced in any Pricing Committee Queue |
| 40 | Rates Declined by Pricing Committee | AIM | Rates are declined in any Pricing Committee Queue |
| 41 | Withdrawn by Pricing Committee | AIM | Item is manually or automatically withdrawn in Pricing Committee Queues |
| 42 | Sent to Underwriters | AIM | Item is progressed to Underwriting Queue |
| 43 | MATCH Information Requested | OLA, AUS | Established by any system that requests MATCH |
| 44 | Credit Score Requested | OLA, AUS | Established by any system that requests Credit Score |
| 45 | OFAC Information Requested | OLA, AUS | TBD |
| 46 | Rates/Fees Correct | AIM | Item passes Rate Verification |
| 47 | Approved by Underwriting | AIM | IMPEX receives disposition from AUS for item |
| 48 | Declined by Underwriting | AIM | IMPEX receives disposition from AUS for item |
| 49 | Withdrawn by Underwriting | AIM | IMPEX receives disposition from AUS for item; automatically withdraws item |
| 50 | Called Merchant | AIM | User generated event; similar to STAR incident called "AIM Note" |
| 51 | Scheduled Appointment | AIM | Verification appointment is scheduled |
| 52 | Verified Merchant | AIM | Item is progressed out of any Verification queu |
| 53 | Withdrawn by Shipping | AIM | Item is withdrawn in any Shipping queue |
| 54 | Internal Pictures Received | AIM | Required document was fulfilled; pictures are often required for new customers who fall into certain risk categories. |
| 55 | REMOVED/Not Used | | |
| 56 | Terminal ID Assigned | CIS | TID is returned from send to Stratus |
| 57 | Packing Slip Sent to Deployment | AIM | Packing Slip is generated; item is in Packing Slip queue |
| 58 | Terminal Profile Built | AIM | Terminal programming information is sent to TPI |
| 59 | REMOVED: Terminal Profile Updated | | |
| 60 | REMOVED: Check Digit Generated | | |
| 61 | Sent to Order Fulfillment | AIM | Item progressed to Order Fulfillment |
| 62 | Withdrawn by Contracts Processing | AIM | Item is withdrawn in Data Check, Install Support or Packing Slips queues |
| 63 | Sent to Deployment | AIM | Item is progressed to Deployment Queue (not Order Fulfillment) |
| 64 | Sent to Verification | AIM | Item is progressed to a Verification Queue |

APPENDIX B-continued

System Triggered Events

| Event Type ID | Description | Business Applications | Trigger |
|---|---|---|---|
| 65 | Packing Slip Printed in Deployment | AIM | similar to STAR incident |
| 66 | Download Notice Generated | AIM | similar to STAR incident |
| 67 | Equipment Pulled from Inventory | AIM | Equipment is scanned in AIM via Inventory; create note with Serial Numbers |
| 68 | Reviewed by Deployment QC | AIM | Item leaves Deployment QC queue |
| 69 | Withdrawn by Deployment | AIM | Item is withdrawn in any Deployment queue |
| 70 | Order Ready for Shipment | AIM | Item enters Shipping Queue |
| 71 | Order Packed | AIM | Item leaves Order Fulfillment Queue |
| 72 | Tracking Number Assigned | AutoShip/Sales App | Auto Ship returns the FED Ex tracking number; store number in tbOrderEvent |
| 73 | Waiting for Carrier Pickup | AIM | Item leaves Shipping Queue |
| 74 | GiftCard Order Shipped By Manufacturer | GC Admin | similar to STAR incident |
| 75 | RewardsCard Order Shipped By Manufacturer | RC Admin | similar to STAR incident |
| 76 | Order Picked up by Carrier | AIM | Shipping department is done with the order and it is now in transit to the customer |
| 77 | Company Installation Ready | AIM | Item enters any CI Installation queue |
| 78 | Onsite Installation Ready | AIM | Item enters Onsite Installation queue |
| 79 | MSP Installation Ready | AIM | Item enters MSP Installation Queue |
| 80 | VAR Installation Ready | AIM | Item enters VAR Installation Queue |
| 81 | Called Merchant | AIM | User generated event; similar to STAR incident called “AIM Note” |
| 82 | Scheduled Appointment | AIM | Item is scheduled in Installation |
| 83 | Merchant Installed | AIM | Item leaves Installation queue |
| 84 | Lease Sent to Golden Eagle | CMS | Agent needs to know this separate contract has been sent |
| 85 | AE Certified Installation | AIM | User generated event; similar to STAR incident called “AIM Note” |
| 86 | Merchant Trained by CI | AIM | User generated event; similar to STAR incident called “AIM Note” |
| 87 | Merchant Trained by Agent | AIM | User generated event; similar to STAR incident called “AIM Note” |
| 88 | Withdrawn by Installation | AIM | Item is withdrawn in any Installation queue |
| 89 | Order Ready for Quality Control | AIM | Order progressed into Quality Control |
| 90 | Order Ready for ISG Quality Control | AIM | Order progressed into ISG Quality Control |
| 91 | Note from Quality Control | AIM | User added notes for Quality Control |
| 92 | Note from ISG | AIM | User added notes for ISG |
| 93 | Note from Pricing Committee | AIM | User added notes for Pricing Committee |
| 94 | Note from Verification | AIM | User added notes for Verification |
| 95 | Note from Contracts Processing | AIM | User added notes for Contracts Processing |
| 96 | Note from Distribution Center | AIM | User added notes for Distribution Center |
| 97 | Note from Distribution Center | AIM | User added notes for Distribution Center |
| 98 | Note from Central Installations | AIM | User added notes for Central Installations |
| 99 | All Required Docs Received | | All required documents have been received |
| 100 | Reinstated by Quality Control | | Manually triggered event; current business applications do not support |
| 101 | Reinstated by Pricing Committee | | Manually triggered event; current business applications do not support |
| 102 | Reinstated by Underwriting | | Manually triggered event; current business applications do not support |
| 103 | Reinstated by Shipping | | Manually triggered event; current business applications do not support |
| 104 | Reinstated by Contracts Processing | | Manually triggered event; current business applications do not support |
| 105 | Reinstated by Deployment | | Manually triggered event; current business applications do not support |
| 106 | Reinstated by Installation | | Manually triggered event; current business applications do not support |

APPENDIX C

Pend Types

| Pend Type ID | Description | Business Applications | Trigger |
|---|---|---|---|
| 1 | Documents Unreadable: Business License | AIM, AUS | User initiated |
| 2 | Documents Unreadable: CPA Pages 1 & 2 | AIM, AUS | User initiated |
| 3 | Documents Unreadable: Financials | AIM, AUS | User initiated |
| 4 | Documents Unreadable: Lease | AIM, AUS | User initiated |
| 5 | Documents Unreadable: Check Addendum | AIM, AUS | User initiated |
| 6 | Documents Unreadable: Internal Pictures | AIM, AUS | User initiated |
| 7 | Documents Unreadable: External Pictures | AIM, AUS | User initiated |
| 8 | Documents Unreadable: Previous Processor Statements | AIM, AUS | User initiated |
| 9 | Documents Unreadable: Rental Agreement | AIM, AUS | User initiated |
| 10 | Documents Unreadable: SSN Documents | AIM, AUS | User initiated |
| 11 | Documents Unreadable: WEX Application | AIM, AUS | User initiated |
| 12 | Documents Unreadable: Additional Services Form | AIM, AUS | User initiated |
| 13 | Documents Unreadable: 3 Tier—Cost Plus Addendum | AIM, AUS | User initiated |
| 14 | Paperwork Missing: Business License | AIM, AUS | User initiated |
| 15 | Paperwork Missing: CPA Pages 1 & 2 | AIM, AUS | User initiated |
| 16 | Paperwork Missing: Financials | AIM, AUS | User initiated |
| 17 | Paperwork Missing: Lease | AIM, AUS | User initiated |
| 18 | Paperwork Missing: Check Addendum | AIM, AUS | User initiated |
| 19 | Paperwork Missing: Internal Pictures | AIM, AUS | User initiated |
| 20 | Paperwork Missing: External Pictures | AIM, AUS | User initiated |
| 21 | Paperwork Missing: Previous Processor Statements | AIM, AUS | User initiated |
| 22 | Paperwork Missing: Rental Agreement | AIM, AUS | User initiated |
| 23 | Paperwork Missing: SSN Documents | AIM, AUS | User initiated |
| 24 | Paperwork Missing: WEX Application | AIM, AUS | User initiated |
| 25 | Paperwork Missing: Additional Services Form | AIM, AUS | User initiated |
| 26 | Paperwork Missing: 3 Tier—Cost Plus Addendum | AIM, AUS | User initiated |
| 27 | Funding Missing | AIM | User initiated |
| 28 | Funding Incorrect | AIM | User initiated |
| 29 | Data Issue | AIM | User initiated |
| 30 | Contract Not Signed | AIM | User initiated |
| 31 | Equipment/Software Issue | AIM | User initiated |
| 32 | Sent to Pricing Committee | AIM | System generated when item is progressed to Pricing Committee Queue |
| 33 | Unable to Verify Merchant | AIM | User initiated |
| 34 | Sales Agent Must Contact Merchant | AIM | User initiated |
| 35 | Unable to Contact Merchant | AIM | User initiated |
| 36 | Incorrect Banking Information | AIM | User initiated |
| 37 | Issues with Packing Slip | AIM | User initiated |
| 38 | Card Type Not Active | AIM | User initiated |
| 39 | Equipment Research | AIM | User initiated |
| 40 | Check Service Configuration Issues | AIM | User initiated |
| 41 | Invalid Shipping Address | AIM | User initiated |
| 42 | Hold for Future Shipment | AIM | User initiated |
| 43 | Underwriting: Financial Statements | AUS | User initiated |
| 44 | Underwriting: Internal Pictures | AUS | User initiated |
| 45 | Underwriting: External Pictures | AUS | User initiated |
| 46 | Underwriting: Processor Statements | AUS | User initiated |
| 47 | Underwriting: Business License | AUS | User initiated |
| 48 | Underwriting: SSN Documents | AUS | User initiated |
| 49 | Underwriting: Website Address | AUS | User initiated |
| 50 | Underwriting: Product Sample/Brochure | AUS | User initiated |
| 51 | Underwriting: Tax Filings | AUS | User initiated |
| 52 | Underwriting: ID Verification | AUS | User initiated |
| 53 | Underwriting: Merchant Interview | AUS | User initiated |
| 54 | Underwriting: Management Review | AUS | User initiated |
| 55 | Underwriting: Other | AUS | User initiated |
| 56 | Awaiting AE Onsite Install | AIM | Pend automatically generated based on installation type |
| 57 | Awaiting AE Install | AIM | Pend automatically generated based on installation type |
| 58 | Rate Verification Error | AIM, AUS | Someone changed the rates on the order and it failed verification; this typically involves moving the order to Pricing |

APPENDIX C-continued

| Pend Types | | | |
|---|---|---|---|
| Pend Type ID | Description | Business Applications | Trigger |
| | | | Committee or an Exceptions Handling group to try and correct the problem |
| 59 | Lead with No Lead Number | OLA | Pend automatically generated when order comes into the Awaiting Lead Number queue; order requires a lead number generated and attached by internal support group. |
| 60 | Underwriting: CPA Missing | AUS | The CPA document has not been scanned in Docupact |
| 61 | Underwriting: Principal Title | AUS | Principal's title is missing or incorrect on the CPA |
| 62 | Underwriting: Credit Risk | AUS | Underwriter/Analyst is concerned with information found on the principal's credit report, financials, etc. and is requesting more information |
| 63 | Underwriting: Detailed Business Description | AUS | The business description provided is too vague or questionable according to underwriting guidelines. |
| 64 | Underwriting: Bankruptcy/Equipment Ownership | AUS | Bankruptcy has been located on the principal's credit report. According to Underwriting guidelines the equipment that the merchant uses for processing cannot be leased. |
| 65 | Underwriting: Parameters | AUS | There may be a discrepancy between the OLA and AUS in the parameters (volume and ticket sizes) requested. The statements provided may not show a processing history similar to the parameters requested. There could also be a large difference between average and high volumes or tickets. Any question regarding parameters will use this pend reason. |

APPENDIX D

| Activity Type Definitions | |
|---|---|
| Activity Type ID | Description |
| 1 | Order Submitted |
| 2 | Quality Control |
| 3 | Pricing |
| 4 | Underwriting |
| 5 | Merchant Verification |
| 6 | Paperwork and Funding |
| 7 | Terminal Setup |
| 8 | Deployment |
| 9 | Shipping |
| 10 | Installation |
| 11 | Training |

What is claimed is:

1. A computerized method for providing status information for an order for a product or service comprising:

developing a plurality of computerized business applications, each of said computerized business applications comprising functionality for recording data related to a plurality of order completion activities for an order for a product or service;

modifying each of said plurality of computerized business applications to execute a stored procedure upon suspension of one of said plurality of activities for said order for said product or service recorded by said computerized business application;

communicating data related to suspension of one of said plurality of activities to an order tracking database;

adding to said order tracking database a suspend event record for said activity, said suspend event record comprising:

(1) an activity identifier identifying said activity related to said order;

(2) a suspended activity identifier providing a description of a suspended activity related to said order; and (3) a suspended reason identifier for recording a resolution to said suspended activity; and providing an interface to said order tracking database to obtain suspension status data for said order for said product or service according to said suspended activity; and displaying for a user of said interface:

(1) suspension status data comprising suspended activities for said order for said product or service from said order tracking database; and (2) for each suspended activity, said description and said resolution for said suspended activity.

2. The computerized method of claim 1 wherein communicating data related to said suspension comprises communicating data in response to a system generated action.

3. The computerized method of claim 1 wherein communicating data related to said suspension comprises communicating data in response to a user generated action.

4. The computerized method of claim 1 wherein displaying for a user of said interface suspension status data for said order for said product or service comprises organizing said status data in steps for said order.

5. The computerized method of claim 4 wherein said steps for said order comprise an order entry step, an order approval step, an order fulfillment step, a shipping step, and an installation step.

6. The computerized method for claim 4 further comprising associating a status indicator with each of said steps.

7. The computerized method of claim 6 wherein said status indicator is selected from the group consisting of "in process," "complete," "pend," and "cancel."

8. The computerized method of claim 1 wherein said product or service is a payment processing system.

9. A computerized system for providing status information for an order for a product or service comprising:

an order tracking database for storing trigger event data related to order completion activities for said product or service;

a queue processor for evaluating and adding trigger event data to said order tracking database;

at least one computer executing a plurality of computerized business applications, each of said computerized business applications comprising functionality for recording order completion activity data for an order for a product or service;

at least one stored procedure for use by each of said plurality of computerized business applications to transmit suspend trigger event data to said queue processor, said suspend trigger event data related to a suspension of said order completion activity data for said order for said product or service recorded by said computerized business applications and comprising:

(1) an activity identifier identifying said activity related to said order;

(2) a suspended activity identifier providing a description of a suspended activity related to said order; and (3) a suspended reason identifier for recording a resolution to said suspended activity; and an interface to said order tracking database for presenting to a user suspension status data for said order for said product or service, said suspension status data related to said trigger event data in said order tracking database and comprising:

(1) suspension status data comprising suspended activities for said order for said product or service from said order tracking database; and (2) for each suspended activity, said description and said resolution for said suspended activity.

10. The computerized system of claim 9 wherein said trigger event data comprises data related to a system generated action.

11. The computerized system of claim 9 wherein trigger event data comprises data related to a user generated action.

12. The computerized system of claim 9 wherein said interface for presenting to a user suspension status data for said order organizes said status data in steps for said order.

13. The computerized system of claim 12 wherein said steps for said order comprise an order entry step, an order approval step, an order fulfillment step, a shipping step, and an installation step.

14. The computerized system of claim 9 further comprising associating a status indicator with each of said steps.

15. The computerized system of claim 14 wherein said status indicator is selected from the group consisting of "in process," "complete," "pend," and "cancel."

16. The computerized system of claim 9 wherein said product or service is a payment processing system.

17. A computerized method for displaying order status information for an order comprising:

(a) storing in an order tracking database order data for said order, said order data comprising:

(i) an order identifier;

(ii) step data for a plurality of steps to be completed to process said order;

(iii) activity data for a plurality of activities to be completed for each step wherein each activity comprises a plurality of events to be completed;

(b) receiving at computer server in a queue processor executing at said server at least one suspend trigger from a business application for processing said order, said suspend event comprising:

(i) an activity identifier identifying an activity within a step for said order; and (ii) a suspended activity identifier identifying a suspended activity related to said activity;

(c) storing in said order tracking database for said order a suspend event record comprising said activity identifier and said suspended activity identifier; and (d) receiving at said computer server a user request to access status data for said order;

(e) in response to receiving said request to access status data for said order, providing to said user status data comprising:

(i) said order identifier; and (ii) a suspended activity indicator related to said suspend event record for said order.

18. The computerized method of claim 17 further comprising receiving at said computer server a user request to view details of said suspend event record, said details comprising:

(1) said activity identifier identifying an activity within a step for said order; and (2) said suspended activity identifier identifying a suspended activity related to said activity.

19. The computerized method of claim 18 wherein said suspended activity identifier comprises a reason for suspending said step within said order.

20. The computerized method of claim 17 wherein status data for said order comprises said suspended activity indicator until status data is updated with a resolution for said suspended activity.

* * * * *